(12) United States Patent
Hatano et al.

(10) Patent No.: US 9,321,227 B2
(45) Date of Patent: Apr. 26, 2016

(54) PHASE DIFFERENCE PLATE MANUFACTURING METHOD, PHASE DIFFERENCE PLATE, AND LIQUID CRYSTAL DISPLAY DEVICE

(75) Inventors: Taku Hatano, Tokyo (JP); Kenichi Harai, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 240 days.

(21) Appl. No.: 13/820,667

(22) PCT Filed: Aug. 31, 2011

(86) PCT No.: PCT/JP2011/069744
§ 371 (c)(1),
(2), (4) Date: Mar. 4, 2013

(87) PCT Pub. No.: WO2012/032982
PCT Pub. Date: Mar. 15, 2012

(65) Prior Publication Data
US 2013/0169910 A1 Jul. 4, 2013

(30) Foreign Application Priority Data
Sep. 7, 2010 (JP) ................................. 2010-200094

(51) Int. Cl.
B29D 11/00 (2006.01)
G02B 5/30 (2006.01)
(Continued)

(52) U.S. Cl.
CPC ........ B29D 11/00788 (2013.01); G02B 5/3083 (2013.01); G02F 1/133528 (2013.01); G02F 1/133634 (2013.01)

(58) Field of Classification Search
IPC ......... G02F 1/133528,1/133634; G02B 5/3083; B29D 11/00788
See application file for complete search history.

(56) References Cited

U.S. PATENT DOCUMENTS

2006/0040106 A1   2/2006   Arakawa et al.
2009/0103012 A1   4/2009   Itadani et al.
(Continued)

FOREIGN PATENT DOCUMENTS

EP   1729156 A1   12/2006
JP   5-157911 A    6/1993
(Continued)

OTHER PUBLICATIONS

Taiwanese Office Action, dated Nov. 21, 2014, for Taiwanese Application No. 100131652.
(Continued)

*Primary Examiner* — Mathieu Vargot
(74) *Attorney, Agent, or Firm* — Birch, Stewart, Kolasch & Birch, LLP

(57) ABSTRACT

A step of forming a layered body including a resin layer (a) containing a resin A having positive intrinsic birefringence and a resin layer (b) containing a resin B having negative intrinsic birefringence, the resin layer (b) being provided on one side of the resin layer (a); a first stretching step of stretching the layered body in one direction at a temperature T1; and a second stretching step of, after the first stretching step, stretching the layered body in another direction that is approximately orthogonal to the previous stretching direction at a temperature T2 which is lower than the temperature T1 to obtain a phase difference plate are performed. By these steps, a phase difference plate wherein a slow axis of the resin layer (a) after the stretching treatment and a slow axis of the resin layer (b) after the stretching treatment are approximately parallel to each other, and in-plane retardation Rea and NZ coefficient NZa in the resin layer (a) after the stretching treatment, and in-plane retardation Reb and NZ coefficient NZb in the resin layer (b) after the stretching treatment satisfy specific relationship is obtained.

6 Claims, 12 Drawing Sheets

(51) Int. Cl.
*G02F 1/1335* (2006.01)
*G02F 1/13363* (2006.01)

(56) References Cited

U.S. PATENT DOCUMENTS

| | | |
|---|---|---|
| 2009/0214869 A1 | 8/2009 | Hatano et al. |
| 2009/0220758 A1* | 9/2009 | Hatano ........................ 428/213 |
| 2009/0237790 A1* | 9/2009 | Hatano et al. ................ 359/500 |
| 2009/0290103 A1 | 11/2009 | Itou |

FOREIGN PATENT DOCUMENTS

| | | | |
|---|---|---|---|
| JP | 2002-107542 A | | 4/2002 |
| JP | 2003-90912 A | | 3/2003 |
| JP | 2007-199616 A | | 8/2007 |
| JP | 2009-192844 A | | 8/2009 |
| JP | 2009-192845 A | | 8/2009 |
| JP | 2009-223163 A | | 10/2009 |
| JP | 2011-39338 A | | 2/2011 |
| JP | 2011-039338 | * | 2/2015 |
| TW | 200942877 A1 | | 10/2009 |
| WO | WO 2005/050300 A1 | | 6/2005 |

OTHER PUBLICATIONS

Chinese Office Action and Search Report for Chinese Application No. 201180053536.4, dated Sep. 2, 2014.
International Search Report issued in PCT/JP2011/069744, mailed on Sep. 27, 2011.
Written Opinion of the International Searching Authority issued in PCT/JP2011/069744, mailed on Sep. 27, 2011.

* cited by examiner

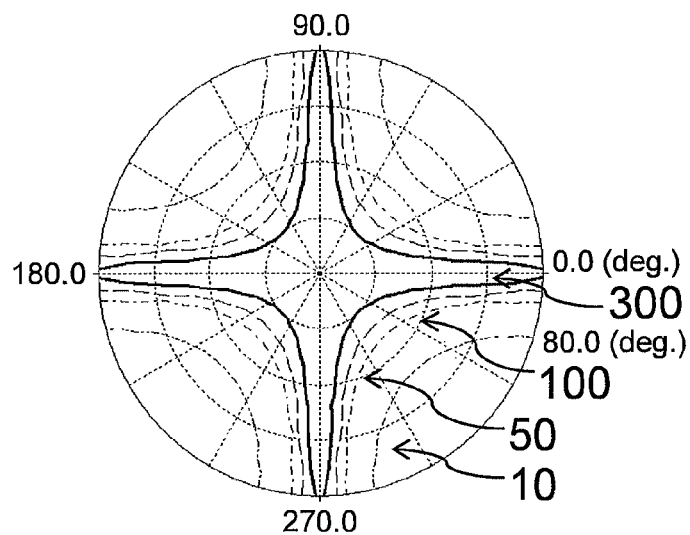
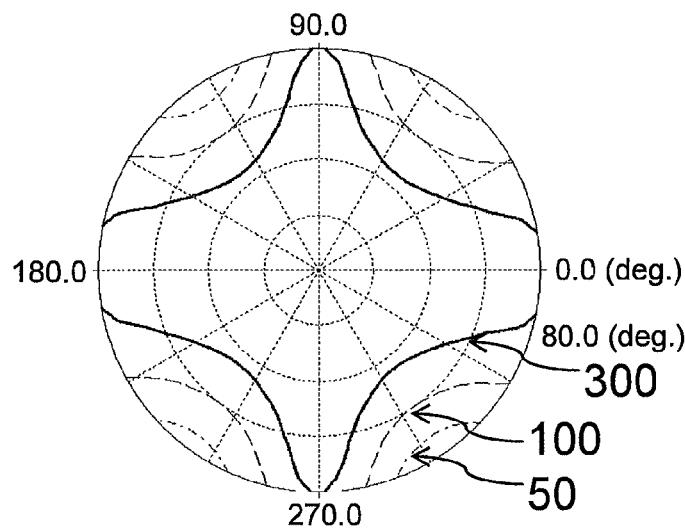

PHASE DIFFERENCE PLATE MANUFACTURING METHOD, PHASE DIFFERENCE PLATE, AND LIQUID CRYSTAL DISPLAY DEVICE

FIELD

The present invention relates to a method for manufacturing a phase difference plate, a phase difference plate, and a liquid crystal display device.

BACKGROUND

A liquid crystal display device usually comprises a liquid crystal cell and a pair of polarizing plates (a light incident side polarizing plate and a light emitting side polarizing plate) which are disposed in a manner of sandwiching the liquid crystal cell. In the case of usual liquid crystal display device modes such as a VA mode and an IPS mode, a pair of polarizing plates are usually disposed in a cross-Nicol arrangement, i.e., disposed so that the absorption axes of the polarizing plates are approximately orthogonal to each other, and designed to give a black imaging (to block transmission of light) in the absence of an electric field.

However, when such a liquid crystal display device is observed from an oblique direction, the absorption axes of the pair of polarizing plates apparently intersect each other at an larger angle (obtuse angle) than a right angle. As a result, light leakage occurs. That is, when the liquid crystal display device is observed from the oblique direction, the black image is more imperfect than the black image when viewed from the front direction. Accordingly, when the liquid crystal display device is observed from the oblique direction, there has been a problem of lower contrast than when the liquid crystal display device is observed from the front direction.

Thus, in order to reduce such light leakage, a liquid crystal display device usually comprises, between a pair of polarizers, a phase difference plate for compensating for light leakage caused by these polarizing plates (appropriately referred to hereinbelow as polarizing plate compensation). As a means of realizing the polarizing plate compensation function, it has been proposed in prior art to interpose a phase difference plate between the pair of polarizer, wherein the phase difference plate has a refractive index Nx in the in-plane slow axis direction, a refractive index Ny in an in-plane direction orthogonal thereto, and a refractive index Nz in the thickness direction which satisfy the relationship of Nx>Nz>Ny. For example, Patent Literature 1 describes stretching of a resin film wherein a shrink film is adhered to one side or both sides of the resin film to form a layered body, and the layered body is then stretched under heating to impart shrinking force in the direction orthogonal to the stretching direction of the resin film. In Patent Literature 1, such a method provides a phase difference plate which satisfies the relationship of 0<(Nx−Nz)/(Nx−Ny)<1.

CITATION LIST

Patent Literature

Patent Literature 1: Japanese Patent Application Laid-Open No. Hei. 5-157911 A

SUMMARY

Technical Problem

However, in the technique of Patent Literature 1, there has been a problem of a complicated method for manufacturing the phase difference plate since such a specific film is prepared for the special treatment. In addition, in the technique of Patent Literature 1, there has been a problem of difficulty in manufacturing the phase difference plate having a broad width since the phase difference plate is obtained by shrinking of the layered body.

The present invention has been made in light of the aforementioned problems, and the object thereof is to provide a phase difference plate which has a broad width and can be manufactured by a simple process, a method for manufacturing the phase difference plate, and a liquid crystal display device comprising the phase difference plate.

Solution to Problem

According to the present invention, the following aspects (1) to (9) of the invention are disclosed.
(1) A method for manufacturing a phase difference plate, comprising:
 a step of forming a layered body including a resin layer (a) containing a resin A having positive intrinsic birefringence and a resin layer (b) containing a resin B having negative intrinsic birefringence, the resin layer (b) being provided on one side of the resin layer (a);
 a first stretching step of stretching the layered body in one direction at a temperature T1; and
 a second stretching step of, after the first stretching step, stretching the layered body in another direction that is approximately orthogonal to the previous stretching direction at a temperature T2 which is lower than the temperature T1 to obtain a phase difference plate,
 wherein, in the phase difference plate, a slow axis of the resin layer (a) after the stretching treatment and a slow axis of the resin layer (b) after the stretching treatment are approximately parallel to each other, and
 wherein in-plane retardation Rea and NZ coefficient NZa in the resin layer (a) after the stretching treatment, and in-plane retardation Reb and NZ coefficient NZb in the resin layer (b) after the stretching treatment satisfy Formulae 1 to 4:

$$30 \text{ nm} < Rea < 60 \text{ nm} \qquad \text{Formula 1}$$

$$2.0 < NZa < 5.0 \qquad \text{Formula 2}$$

$$60 \text{ nm} < Reb < 90 \text{ nm} \qquad \text{Formula 3}$$

$$-2.0 < NZb < -0.5 \qquad \text{Formula 4.}$$

(2) A method for manufacturing a phase difference plate, comprising:
 a step of forming a layered body including a resin layer (a) containing a resin A having positive intrinsic birefringence, a resin layer (b) containing a resin B having negative intrinsic birefringence, the resin layer (b) being provided on one side of the resin layer (a), and a resin layer (c) containing a resin C having positive intrinsic birefringence, the resin layer (c) being provided on a side of the resin layer (b) that is the opposite to the resin layer (a);
 a first stretching step of stretching the layered body in one direction at a temperature T1; and
 a second stretching step of, after the first stretching step, stretching the layered body in another direction that is approximately orthogonal to the previous stretching direction at a temperature T2 which is lower than the temperature T1 to obtain a phase difference plate,
 wherein a slow axis of the resin layer (a) after the stretching treatment is approximately parallel to each of a slow axis of the resin layer (b) after the stretching treatment and a slow axis of the resin layer (c) after the stretching treatment in the phase difference plate, and wherein in-plane retardation Rea and NZ coefficient NZa in the resin layer (a) after the stretching treatment, in-plane retardation Reb and NZ coefficient NZb in the resin layer (b) after the stretching treatment, and in-plane retardation Rec and NZ coefficient NZc in the resin layer (c) after the stretching treatment satisfy Formulae 5 to 10:

$$30 \text{ nm} < Rea < 60 \text{ nm} \quad \text{Formula 5}$$

$$2.0 < NZa < 5.0 \quad \text{Formula 6}$$

$$70 \text{ nm} < Reb < 110 \text{ nm} \quad \text{Formula 7}$$

$$-2.0 < NZb < -0.5 \quad \text{Formula 8}$$

$$10 \text{ nm} < Rec < 30 \text{ nm} \quad \text{Formula 9}$$

$$2.0 < NZc < 5.0 \quad \text{Formula 10.}$$

(3) The aforementioned method for manufacturing a phase difference plate, wherein a glass transition temperature $Tg_A$ of the resin A and a glass transition temperature $Tg_B$ of the resin B satisfy a relationship of $Tg_A > Tg_B + 5°$ C.

(4) The aforementioned method for manufacturing a phase difference plate, wherein a stretching ratio in the first stretching step is 2 to 4 times, and a stretching ratio in the second stretching step is 1.1 to 2 times.

(5) The aforementioned method for manufacturing a phase difference plate, wherein the layered body is a lengthy film.

(6) The aforementioned method for manufacturing a phase difference plate, wherein the layered body is stretched in a crosswise direction in the first stretching step and stretched in a lengthwise direction in the second stretching step.

(7) A phase difference plate obtained by the aforementioned manufacturing method.

(8) A liquid crystal display device comprising a pair of polarizing plates disposed so that absorption axes are approximately orthogonal to each other, and a liquid crystal cell interposed between the pair of polarizing plates, wherein the liquid crystal display device comprises the aforementioned phase difference plate interposed between the liquid crystal cell and one of the pair of the polarizing plates.

(9) The aforementioned liquid crystal display device, wherein the liquid crystal cell is of an in-plane switching display mode.

Advantageous Effects of Invention

The manufacturing method and the phase difference plate of the present invention have the effect of simply manufacturing a phase difference plate which has a relatively broad width and can compensate for light leakage caused by a pair of polarizing plates. Further, since the liquid crystal display device of the present invention comprises the phase difference plate of the present invention which can be manufactured by simple process, lower cost can be realized.

BRIEF DESCRIPTION OF DRAWINGS

FIG. 6 is a contrast contour map measured in Comparative Example 2.

FIG. 7 is a contrast contour map measured in Comparative Example 3.

DESCRIPTION OF EMBODIMENTS

Figure 1:
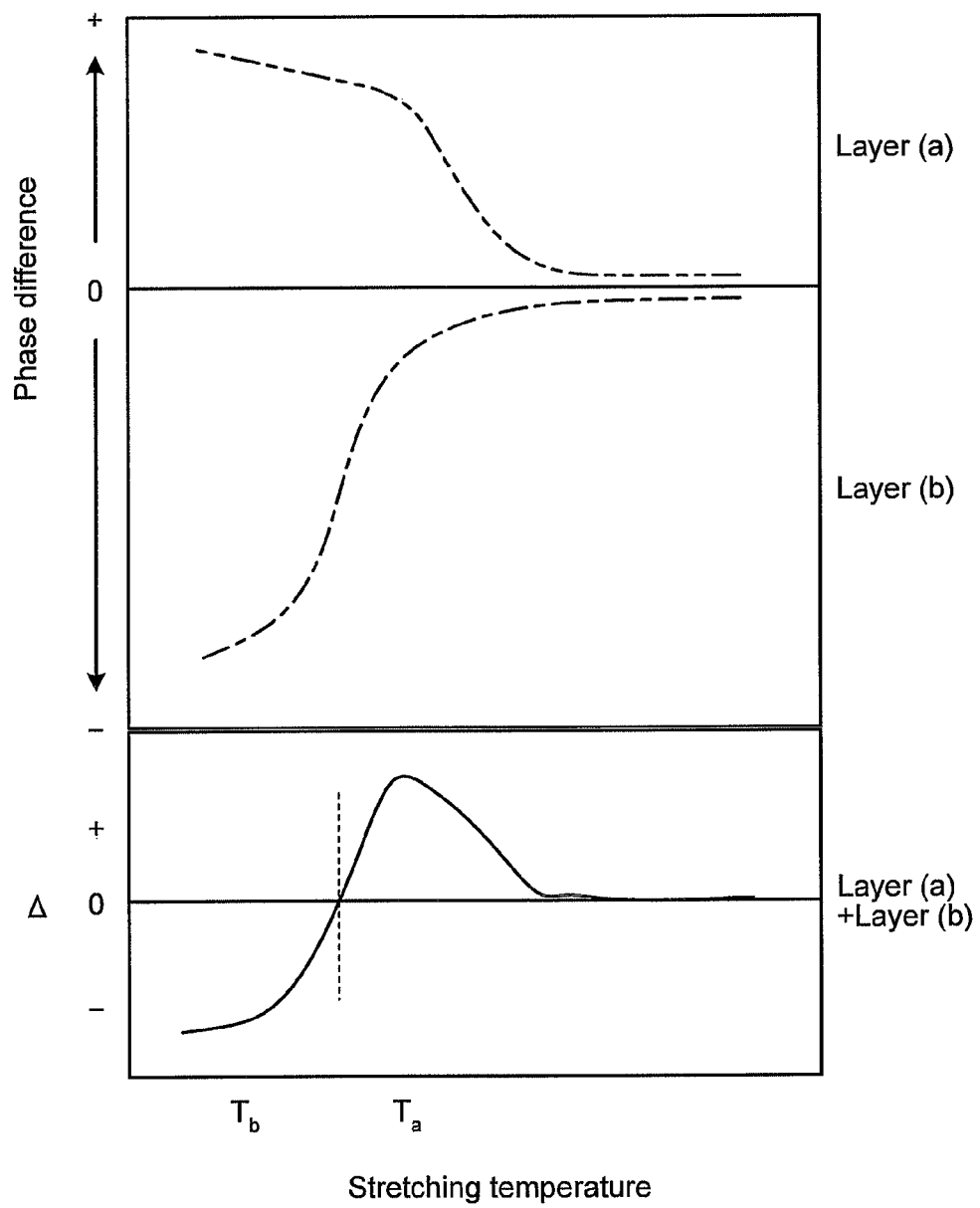
FIG. 1 is a graph illustrating an example of temperature dependence of phase difference Δ when a resin layer (a) and a resin layer (b) of a layered body for manufacturing a phase difference plate are each stretched, and an example of temperature dependence of phase difference Δ when a layered body for manufacturing a phase difference plate (in this case, the resin layer (a)+the resin layer (b)) is stretched, assuming that a resin A constituting the resin layer (a) has a higher glass transition temperature $Tg_A$ and a resin B constituting the resin layer (b) has a lower glass transition temperature $Tg_B$.

The present invention will be described hereinbelow in detail by way of illustrations and embodiments, although the present invention is not limited to the following illustrations and embodiments and may be optionally modified and practiced without departing from the scope of the claims of the present invention. The reference character "A" of the resin A, the reference character "B" of the resin B, the reference character "C" of the resin C, the reference character "(a)" of a resin layer (a), the reference character "(b)" of a resin layer (b), and the reference character "(c)" of a resin layer (c) as will be described later are intended to distinguish the elements labeled with the reference characters from other elements, and do not have any other meanings than to distinguish the elements.

[1. Method for Manufacturing Phase Difference Plate of the Present Invention]

The phase difference plate of the present invention is manufactured by a manufacturing method comprising: a step of forming a layered body including a resin layer (a) containing a resin A which has positive intrinsic birefringence and a resin layer (b) containing a resin B which is provided on one side of the resin layer (a) and has negative intrinsic birefringence, or a layered body including, in addition to the resin layer (a) and the resin layer (b), a resin layer (c) containing a resin C which is provided on a side of the resin layer (b) that is the opposite to the resin layer (a) and has positive intrinsic birefringence (the layered bodies may be appropriately referred to hereinbelow as a "layered body for manufacturing a phase difference plate") (a layered body forming step); a first stretching step of stretching the layered body in one direction at a temperature T1; and a second stretching step of, after the first stretching step, stretching the layered body in another direction that is approximately orthogonal to the previous stretching direction at a temperature T2 which is lower than the temperature T1 to obtain a phase difference plate.

As used herein, the positive intrinsic birefringence means that the refractive index in the stretched direction is larger than the refractive index in the direction orthogonal thereto, whereas the negative intrinsic birefringence means that the refractive index in the stretched direction is smaller than the refractive index in the direction orthogonal thereto. The value of the intrinsic birefringence may also be calculated from the permittivity distribution.

[1-1. Layered Body Forming Step]

The layered body for manufacturing a phase difference plate is not particularly limited as long as the layered body has the resin layer (a) and the resin layer (b), or the resin layer (a), the resin layer (b), and the resin layer (c) layered in this order. Particularly, the layered body is preferably manufactured by a co-extrusion method or a co-casting method of the resin A and the resin B, or the resin A, the resin B, and the resin C. Among them, the co-extrusion method is preferable from the viewpoints which will be described later.

(i. Resin A)

The resin A is preferably a thermoplastic resin having positive intrinsic birefringence.

Examples of a polymer included in the resin A may include olefin polymers such as polyethylene and polypropylene; polyesters such as polyethylene terephthalate and polybutylene terephthalate; polyarylene sulfides such as a polyphenylene sulfide; a polyvinyl alcohol, a polycarbonate, a polyallylate, a cellulose ester polymer, a polyether sulphone, a polysulfone, a polyallylsulfone, a polyvinyl chloride, a norbornene polymer, and a rod-shaped liquid crystal polymer. As the polymer, one species thereof may be used alone, or two or more species thereof may be used in combination at any ratio. Further, the polymer may be a homopolymer or a copolymer. Among them, the polycarbonate is preferable in view of the phase difference expression, the stretching property at low temperatures, and the adhesion of the resin layer (a) to layers other than the resin layer (a).

The resin A may contain an additive. Examples of the additives may include an antifriction agent; a lamellar crystal compound; inorganic fine particles; stabilizers such as an antioxidant, a thermostabilizer, a light stabilizer, a weathering stabilizer, an ultraviolet absorber, and a near infrared absorber; a plasticizer; coloring agents such as a dye and a pigment; and an antistatic agent. Among them, the antifriction agent and the ultraviolet absorber are preferable because of their ability to improve flexibility and weather resistance. The amount of the additive may appropriately be determined in the range in which the agent does not significantly impair the effects of the invention. For example, the amount thereof may fall within the range which allows the layered body for manufacturing a phase difference plate to keep a total light transmittance of 80% or more with a thickness of 1 mm.

Examples of the antifriction agent may include inorganic particles such as silicon dioxide, titanium dioxide, magnesium oxide, calcium carbonate, magnesium carbonate, barium sulfate, and strontium sulfate; and organic particles such as polymethyl acrylate, polymethyl methacrylate, polyacrylonitrile, polystyrene, cellulose acetate, and cellulose acetate propionate. Among them, the organic particles are preferable as the antifriction agent.

Examples of the ultraviolet absorber may include oxybenzophenone-based compounds, benzotriazol-based compounds, salicylate-based compounds, benzophenone-based ultraviolet absorbers, benzotriazol-based ultraviolet absorbers, acrylonitrile-based ultraviolet absorbers, triazine-based compounds, nickel complex salt-based compounds, and inorganic powders. Specific examples of the suitable ultraviolet absorber may include 2,2'-methylenebis(4-(1,1,3,3-tetramethylbutyl)-6-(2H-benzotriazol-2-yl)phenol), 2-(2'-hydroxy-3'-tert-butyl-5'-methylphenyl)-5-chlorobenzotriazole, 2,4-di-tert-butyl-6-(5-chlorobenzotriazole-2-yl)phenol, 2,2'-dihydroxy-4,4'-dimethoxybenzophenone, and 2,2',4,4'-tetrahydroxybenzophenone. Particularly suitable examples may include 2,2'-methylenebis(4-(1,1,3,3-tetramethylbutyl)-6-(2H-benzotriazol-2-yl)phenol).

As the additives, one species thereof may be used alone, or two or more species thereof may be used in combination at any ratio.

The weight average molecular weight of the resin A is preferably adjusted within the range which allows the resin A to be processed by methods such as a melt extrusion method and a solution casting method.

The glass transition temperature $Tg_A$ of the resin A is usually 80° C. or higher, preferably 90° C. or higher, more preferably 100° C. or higher, still more preferably 110° C. or higher, and particularly preferably 120° C. or higher. With such a high glass transition temperature $Tg_A$, the orientational relaxation of the resin A can be reduced. The upper limit of the glass transition temperature $Tg_A$ is not particularly limited, and is usually 200° C. or lower.

The fracture elongation of the resin A at the glass transition temperature $Tg_B$ of the resin B which will be described later is preferably 50% or more, and more preferably 80% or more. When the fracture elongation is within this range, the phase difference plate of the present invention can be stably produced by stretching. The fracture elongation is determined using the test piece of type 1B in accordance with JIS K7127 at a tensile speed of 100 mm/min. The upper limit of the fracture elongation of the resin A is not particularly limited, and is usually 200% or less.

(ii. Resin B)

The resin B is preferably a thermoplastic resin having negative intrinsic birefringence.

Examples of a polymer included in the resin B may include a polystyrene-based polymer including a homopolymer of styrene or a styrene derivative or a copolymer thereof with another monomer; a polyacrylonitrile, a polymethyl methacrylate, and a multi-component copolymer thereof. Preferable example of other monomers included in the polystyrene-based polymer may include acrylonitrile, maleic anhydride, methyl methacrylate, and butadiene. As the polymer, one species thereof may be used alone, or two or more species thereof may be used in combination at any ratio. Among them, the polystyrene-based polymer is preferable in view of high phase difference expression, and moreover the copolymer of styrene or a styrene derivative with maleic anhydride is particularly preferable in terms of high thermal resistance.

The resin B may include an additive. Examples of the additives may include the same additives that the resin A may contain. The amount of the additive may be appropriately determined in the range in which the additive does not significantly impair the effects of the invention. For example, the amount thereof may fall within the range which allows the layered body for manufacturing a phase difference plate to keep a total light transmittance of 80% or more with a thickness of 1 mm. As the additive, one species thereof may be used alone, or two or more species thereof may be used in combination at any ratio.

The weight average molecular weight of the resin A is preferably adjusted within the range which allows the resin B to be processed by methods such as a melt extrusion method and a solution casting method.

The glass transition temperature $Tg_B$ of the resin B is usually 80° C. or higher, preferably 90° C. or higher, more preferably 100° C. or higher, still more preferably 110° C. or higher, and particularly preferably 120° C. or higher. With such a high glass transition temperature $Tg_B$, the orientational relaxation of the resin B can be reduced. The upper limit of the glass transition temperature $Tg_B$ is not particularly limited, and is usually 200 C.° or lower.

The fracture elongation of the resin B at the glass transition temperature $Tg_A$ of the resin A is preferably 50% or more, and more preferably 80% or more. The upper limit of the fracture elongation of the resin B is not particularly limited, and is usually 200% or less. When the resin has a fracture elongation within this range, the phase difference plate of the present invention can be stably produced by stretching.

The absolute value of the difference between the glass transition temperature $Tg_A$ of the resin A and the glass transition temperature $Tg_B$ of the resin B is preferably more than 5° C. and more preferably 8° C. or more, and preferably 40° C. or less and more preferably 20° C. or less. When the absolute value of the difference between the aforementioned glass transition temperatures is too small, the temperature dependence of phase difference expression tends to be smaller. On the other hand, when the absolute value of the difference between the aforementioned glass transition temperatures is too large, stretching of the resin having higher glass transition temperature may become difficult, so that the flatness of the phase difference plate possibly tends to be reduced. The aforementioned glass transition temperature $Tg_A$ is preferably higher than the glass transition temperature $Tg_B$. Therefore, it is usually preferable that the resin A and the resin B satisfy the relationship of $Tg_A > Tg_B + 5°$ C.

(iii. Resin C)

The resin C may be the same as the resin A. That is, as the resin C, any resin may be used among the resins which satisfy the requirements described in the section of the resin A. In particular, the resin C is preferably the same resin as the resin A. Having the same resin as the resin A and the resin C, deflection and warpage of the layered body for manufacturing a phase difference plate and the phase difference plate can be advantageously suppressed.

In the present invention, the co-extrusion method may be suitably used. Examples of the co-extrusion method may include a co-extrusion T-die method, a co-extrusion inflation method, and a co-extrusion lamination method. The co-extrusion is an excellent forming method in terms of production efficiency and in view of preventing volatile components such as a solvent from remaining in a formed film. Among them, the co-extrusion T-die method is preferable. The co-extrusion T-die method may be of a feed block type and of a multi-manifold type, and the multi-manifold type is particularly preferable in terms of less fluctuated thickness of the resin layer (a).

When the co-extrusion T-die method is employed, the melting temperature of the resin in the extruder having T-die may be set to a temperature higher than the glass transition temperature (Tg) of each resin preferably by 80° C. or more and more preferably by 100° C. or more, and preferably by 180° C. or less and more preferably by 150° C. or less. Excessively low melting temperature of the resin in the extruder may cause insufficiency in fluidity of the resin, whereas excessively high melting temperature may result in deterioration of the resin.

Usually, the sheet-shaped melted resin which has been extruded from the opening portion of the die is brought into close contact with a cooling drum. The method for bringing the melted resin in close contact with the cooling drum is not particularly limited, and examples thereof may include an air knife method, a vacuum box method, and an electrostatic adhesion method.

The number of the cooling drums is not particularly limited, and is usually two or more. Examples of the form of cooling drum arrangement may include a straight line form, a Z form, and an L form, although the form is not particularly limited. Furthermore, the manner of passing the melted resin which has been extruded from the opening portion of the die to the cooling drum is not particularly limited.

The degree how close the contact of the extruded sheet-shaped resin with the cooling drum is may change depending on the temperature of the cooling drum. Higher temperature of the cooling drum results in closer contact, although excessively higher temperature may cause a problem such that the sheet-shaped resin sticks to the cooling drum and is wound around the drum. Accordingly, the temperature of the cooling drum is preferably $(Tg+30)°$ C. or lower, and more preferably in the range of $(Tg-5)°$ C. to $(Tg-45)°$ C., in which Tg represents the glass transition temperature of the resin in the layer being in contact with the drum among the resins extruded from the die. Problems such as slipping and flaw can thereby be prevented.

It is preferable to reduce the residual solvent content in the layered body for manufacturing a phase difference plate. Examples of the means therefor may include (1) reducing the residual solvent in the resin used as a material; and (2) pre-drying the resin before forming the layered body for manufacturing a phase difference plate. The predrying may be performed by configuring the resin in a form of, e.g., a pellet and drying the same with, e.g., a hot air dryer. The drying temperature is preferably 100° C. or higher, and the drying time is preferably 2 hours or longer. By the predrying, the residual solvent in the layered body for manufacturing a phase difference plate can be reduced, and foaming in the extruded sheet-shaped resin can be prevented.

(iv. Layered Body for Manufacturing Phase Difference Plate)

When the layered body for manufacturing a phase difference plate is stretched at different temperatures T1 and T2 in the different directions which are approximately orthogonal to each other, phase difference is generated depending on the respective temperatures T1 and T2 and the stretching direction in each of the resin layer (a), the resin layer (b), and the resin layer (c). Accordingly, phase difference generated in the resin layer (a), phase difference generated in the resin layer (b), and phase difference generated in the resin layer (c) are combined, whereby the entire layered body of the phase difference plate of the present invention including the resin layer (a), the resin layer (b), and the resin layer (c) satisfies the relationship of Nx>Nz>Ny. In the formula, Nx represents the refractive index in the in-plane slow axis direction, Ny represents the refractive index in the in-plane direction orthogonal to the slow axis direction, and Nz represents the refractive index in the thickness direction. The polarizing plate compensation function is thereby expressed.

The degree of phase difference which is generated in the resin layer (a), the resin layer (b), and the resin layer (c) by stretching depends on, e.g., the thickness of the layered body, for manufacturing a phase difference plate, the stretching temperature, and the stretching ratio. Accordingly, the configuration of the layered body for manufacturing a phase difference plate may be determined in accordance with optical functions to be expressed such as polarizing plate compensation function. When the configuration of the layered body for manufacturing a phase difference plate, as well as the stretching temperature, the stretching ratio in stretching, and others are determined such that the phase differences defined in Formulae 1 to 4 or defined in Formulae 5 to 10 are expressed in the phase difference plate of the present invention, the phase difference plate of the present invention usually expresses the polarizing plate compensation function. Therefore, the configuration of the layered body for manufacturing a phase difference plate may be set in many ways.

Especially, it is preferable that the layered body for manufacturing a phase difference plate satisfies the requirement that the phase of the linearly polarized light which is incident perpendicular on a film surface and has an oscillation plane of the electric vector on the XZ plane (appropriately referred to hereinbelow as "XZ polarized light") relative to the linearly polarized light which is incident perpendicular on the film surface and has an oscillation plane of the electric vector on the YZ plane (appropriately referred to hereinbelow as "YZ polarized light".) is:

retarded when the layered body is uniaxially stretched in the X-axis direction at one of the temperatures T1 and T2 (usually at the temperature T1), and advanced when the layered body is uniaxially stretched in the X-axis direction at the other of the temperatures T1 and T2 (usually at the temperature T2), wherein the X-axis is the stretching direction for a certain direction (i.e., a uniaxial stretching direction), the Y-axis is the direction orthogonal to the uniaxial stretching direction in the film plane, and the Z-axis is the thickness direction of the film (this requirement is appropriately referred to hereinbelow as a "requirement P").

It is preferable that the requirement P is satisfied when at least one direction is assigned to the X-axis among a variety of in-plane directions in the layered body for manufacturing a phase difference plate. Usually, the layered body for manufacturing a phase difference plate is an isotropic raw-material film. Therefore, as long as the requirement P is satisfied when one in-plane direction is assigned to the X-axis, the requirement P can be satisfied even if any other direction is assigned to the X-axis.

In the film in which the slow axis appears along the X-axis as a result of the uniaxial stretching, the phase of the XZ polarized light is retarded relative to that of the YZ polarized light. On the other hand, in the film in which the fast axis appears along the X-axis as a result of the uniaxial stretching, the phase of the XZ polarized light is advanced relative to that of YZ polarized light.

The layered body for manufacturing a phase difference plate according to the present invention is a layered body utilizing these characteristics, and is usually a film in which the manner of the expression of the slow axis or the fast axis depends on the stretching temperature. Such temperature dependence of phase difference expression may be controlled by, e.g., adjusting the photoelastic coefficient of the resin A, the resin B, and the resin C, as well as the relationships such as the ratio of the thickness of each layer.

The in-plane phase difference is the value obtained by multiplying a value of difference between the refractive index $n_X$ in the X-axis direction and the refractive index $n_Y$ in the Y-axis direction ($=|n_X-n_Y|$) by the thickness d, wherein the X-axis direction is the stretching direction and the Y-axis direction is the direction orthogonal to the stretching direction. The phase difference of the layered body having the resin layer (a), the resin layer (b), and the resin layer (c) is generated by the combination of the phase difference of the resin layer (a), the phase difference of the resin layer (b), and the phase difference of the resin layer (c). Therefore, in order to cause sign reversal of the phase difference of the layered body including the resin layer (a), the resin layer (b), and the resin layer (c) by stretching at the higher temperature T1 and the lower temperature T2, it is preferable to adjust the thicknesses of the resin layer (a), the resin layer (b), and the resin layer (c) so that (i) stretching at the lower temperature T2 results in smaller absolute value of the phase difference expressed by the resin having a higher glass transition temperature than the absolute value of the phase difference expressed by the resin having a lower glass transition temperature, and (ii) stretching at the higher temperature T1 results in smaller absolute value of the phase difference expressed by the resin having a lower glass transition temperature than the absolute value of the phase difference expressed by the resin having a higher glass transition temperature.

Accordingly, by adjusting the difference between the refractive index $n_X$ in the X-axis direction and the refractive index $n_Y$ in the Y-axis direction which are expressed in each of the resin layer (a), the resin layer (b), and the resin layer (c) as a result of stretching in one direction (i.e., as a result of uniaxial stretching), as well as adjusting the total thickness of the resin layer (a), the total thickness of the resin layer (b), and the total thickness of the resin layer (c), it is possible to obtain the layered body for manufacturing a phase difference plate satisfying the requirement P (i.e., the requirement such that the phase of the XZ polarized light relative to that of the YZ polarized light is retarded when the layered body is uniaxially stretched in the X-axis direction at one of the temperatures T1 and T2, and is advanced when the layered body is uniaxially stretched in the X-axis direction at the other of the temperatures T1 and T2).

Expression of the phase difference when the layered body for manufacturing a phase difference plate satisfying the requirement P is stretched will be specifically described with reference to the drawings. FIG. 1 illustrates an example of temperature dependence of phase difference Δ when the resin layer (a) (the resin layer (c)) and the resin layer (b) of the layered body for manufacturing a phase difference plate are each stretched, as well as an example of temperature dependence of phase difference Δ when the layered body for manufacturing a phase difference plate is stretched, assuming that the resin A and the resin C are the same resin, and that the resin A (or the resin C) constituting the resin layers (a) and (c) has a higher glass transition temperature $Tg_A$ and the resin B constituting the resin layer (b) has a lower glass transition temperature $Tg_B$. In the layered body for manufacturing a phase difference plate as illustrated in FIG. 1, stretching at the temperature $T_b$ causes larger negative phase difference expression in the resin layer (b) than positive phase difference expression in the resin layer (a), whereby the entire phase difference plate will express a negative phase difference Δ.

On the other hand, stretching at the temperature $T_a$ causes smaller negative phase difference expression in the resin layer (b) than positive phase difference expression in the resin layer (a), whereby the entire phase difference plate will express a positive phase difference Δ. Therefore, by combining such stretching at the different temperatures $T_a$ and $T_b$, it is possible to combine the phase differences generated in stretching at respective temperatures, to stably realize a phase difference plate which has desired phase difference and thus exerts a desired optical function.

Examples of the configuration of the layered body for manufacturing a phase difference plate may include an instance wherein the resin A and the resin C are made of a polycarbonate-based resin and the resin B is made of a polystyrene-based polymer. In the layered body for manufacturing a phase difference plate, the ratio of the total thickness of the resin layer (a) and the resin layer (c) relative to the total thickness of the resin layer (b) ((the total of the thickness of the resin layer (a)+the total of the thickness of the resin layer (c))/the total of the thickness of the resin layer (b)) is usually 1/15 or more and preferably 1/10 or more, and usually 1/4 or less. When the resin layer (a) (or the resin layer (c)) is too thick or the resin layer (b) is too thick, the temperature dependence of phase difference expression tends to be smaller.

The total thickness of the layered body for manufacturing a phase difference plate is preferably 10 μm or more, more preferably 20 μm or more, and particularly preferably 30 μm or more, and preferably 500 μm or less, more preferably 200 μm or less, and particularly preferably 150 μm or less. When the layered body for manufacturing a phase difference plate is thinner than the lower limit of the aforementioned range, sufficient phase difference may be unobtainable and the mechanical strength tends to be weaker. When the layered body is thicker than the upper limit of the aforementioned range, the flexibility may be deteriorated to cause handling problems.

When the resin A and the resin C are the same resin, the ratio of the thickness of the resin layer (a) to the thickness of the resin layer (c), i.e., "the thickness of the resin layer (a)/the thickness of the resin layer (c)" is preferably 1.5/1 or more in view of compensating light leakage of the polarizing plate. In view of maintaining the accuracy of the thickness of the resin layer (c), "the thickness of the resin layer (a)/the thickness of the resin layer (c)" is preferably 10/1 or less.

Furthermore, in the layered body for manufacturing a phase difference plate, the fluctuation in thickness of each of the resin layer (a), the resin layer (b), and the resin layer (c) on the entire surface is preferably 1 μm or less. This can reduce fluctuation in the color tone of the phase difference plate of the present invention. In addition, the tone change after long-term use of the phase difference plate of the present invention can be made uniform.

In order to restrict the thickness fluctuation of each resin layer on the entire surface to be 1 μm or less, for example, the followings may be carried out: (1) providing a polymer filter having openings of 20 μm or less in the extruder; (2) rotating a gear pump at 5 rpm or higher; (3) disposing surrounding means at the circumference of the die; (4) setting an air gap to 200 mm or less; (5) performing edge pinning when the film is cast on the cooling roll; and (6) as an extruder, using a twin screw extruder or a single screw extruder having a double flight-type screw.

The thickness of each resin layer may be calculated as follows. The total thickness of the film is measured using a commercially available contact-type thickness meter, and the portion whose thickness has been measured is then cut and the cross section thereof is observed with an optical microscope, to determine the ratio of the thickness of each layer. From the ratio, the thickness of each resin layer may be calculated. The aforementioned procedure may be carried out at regular intervals in the MD direction of the film (in the flow direction of the film) and in the TD direction of the film (in the width direction of the film) to determine the average thickness and its fluctuation.

The thickness fluctuation is calculated on the basis of the arithmetic average $T_{ave}$ of the measured value measured in the aforementioned manner, in accordance with the following formula with the maximum value $T_{max}$ and the minimum value $T_{min}$ of the thickness T measured.

Thickness fluctuation (μm)=larger one of $T_{ave}-T_{min}$ and $T_{max}-T_{ave}$.

The layered body for manufacturing a phase difference plate may have an optional layer other than the resin layer (a), the resin layer (b), and the resin layer (c), unless the effect of the present invention is significantly impaired. Examples of the optional layer may include an adhesion layer for adhering the resin layers to each other, a matte layer for improving sliding property of the film, a hard-coat layer such as an impact-resistant polymethacrylate resin layer, an antireflection layer, and a stain-proofing layer. The optional layer may be provided after the layered body for manufacturing a phase difference plate is obtained by co-extrusion. Alternatively, the optional layer may also be provided by co-extruding the materials for forming the optional layer with the resins A to C upon co-extrusion of the resins A to C.

The layered body for manufacturing a phase difference plate preferably has a total light transmittance of 85% or more. When the total light transmittance is less than 85%, the phase difference plate of the present invention may become unsuitable as an optical member. The upper limit thereof is ideally 100%. The light transmittance may be measured using the spectrophotometer (produced by Jasco Corporation, ultraviolet visible near-infrared spectrophotometer "V-570") in accordance with JIS K0115.

The layered body for manufacturing a phase difference plate has a haze of preferably 5% or less, more preferably 3% or less, and particularly preferably 1% or less. Having a low haze may result in improved clarity of the display image of the display device having the phase difference plate of the present invention incorporated therein. The lower limit thereof is ideally zero. In this case, the haze is the average value calculated from measurement at five points in accordance with JIS K7361-1997 using the "turbidity meter NDH-300A" produced by Nippon Denshoku Industries Co., Ltd.

The layered body for manufacturing a phase difference plate has ΔYI of preferably 5 or less, and more preferably 3 or less. When this ΔYI is within the aforementioned range, favorable visibility can be achieved without coloring. The lower limit thereof is ideally zero. The ΔYI is measured in accordance with ASTM E313 using the "spectrocolorimeter SE2000" produced by Nippon Denshoku Industries Co., Ltd. The same measurement is repeated 5 times and the arithmetic average thereof is calculated.

The layered body for manufacturing a phase difference plate preferably has an outer surface which is flat with substantially no linear recess and linear projection (so-called die line) which are irregularly generated and extend in the MD direction. As used therein, the expression "flat with substantially no linear recess and linear projection which are irregularly generated" means that, even if a linear recess and a linear projection are formed, the linear recess has a depth of less than 50 nm or a width of more than 500 nm, and the linear projection has a height of less than 50 nm or a width of more than 500 nm. More preferably, the linear recess has a depth of less than 30 nm or a width of more than 700 nm, and the linear projection has a height of less than 30 nm or a width of more than 700 nm. Such a configuration can prevent interference of light and generation of light leakage caused by, e.g., optical refraction in the linear recess and the linear projection, and thereby can improve optical performance. In addition, the expression "irregularly generated" means being formed in an unintended size or shape, etc., at an unintended position.

The aforementioned depth of the linear recess, the height of the linear projection, and the width thereof may be determined by the following method. The layered body for manufacturing a phase difference plate is irradiated with light and the transmitted light is projected on a screen. The portion corresponding to bright or dark stripes of the light appearing on the screen (this portion has a deep linear recess and a high linear projection) is cut out in a 30 mm square. The surface of the cut-out film piece is observed using a three-dimensional surface structure analysis microscope (visual field area of 5 mm×7 mm). The observed image is then converted into a three-dimensional image and the cross-sectional profile is determined from this three-dimensional image. The cross-sectional profile is determined at 1 mm intervals, in the visual field area.

An average line is drawn on this cross-sectional profile. Then, the length from this average line to the bottom of the linear recess is taken as the depth of the linear recess and the length from the average line to the top of the linear projection is taken as the height of the linear projection. The distance between the intersections of the average line and the profile is taken as the width. The maximum values of the depth of the linear recess and the height of the linear projection are determined from the measured values thereof, and then the widths of the linear recess and the linear projection which have these maximum values are determined. The maximum values of the depth of the linear recess and the height of the linear projection and the widths of the linear recess and the linear projection which have these maximum values, which are determined in the aforementioned manner, are taken as the depth of the linear recess, the height of the linear projection, and the widths thereof in the film, respectively.

The layered body for manufacturing a phase difference plate may have a size of, for example, 1000 mm to 2000 mm in the TD direction. The size of the layered body for manufacturing a phase difference plate in the MD direction is not particularly limited, and it is preferable that the layered body is a lengthy film. As used herein, the "lengthy" film refers to a film having a length longer than 5 or more times the width of the film, preferably a length longer than 10 or more times the width, and specifically a length sufficient to be taken-up in a roll shape for storage or transportation.

[1-2. First Stretching Step]

In the first stretching step, the layered body for manufacturing a phase difference plate is stretched in one direction at the temperature T1. That is, the layered body for manufacturing a phase difference plate is uniaxially stretched at the temperature T1. Stretching at the temperature T1 causes phase difference in each of the resin layers (a) to (c) depending on, e.g., the configuration of the layered body for manufacturing a phase difference plate, the stretching temperature T1, and the stretching ratio. The stretching also causes phase difference of the entire layered body for manufacturing a phase difference plate including the resin layers (a) to (b) (and also including the resin layer (c) when the resin layer (c) is included). In this case, for example, when the layered body for manufacturing a phase difference plate satisfies the requirement P, the phase of XZ polarized light relative to YZ polarized light will be retarded or advanced.

On the basis of the glass transition temperature $Tg_A$ of the resin A, the glass transition temperature $Tg_B$ of the resin B, and the glass transition temperature $Tg_C$ of the resin C, the temperature T1 is preferably higher than $Tg_B$, more preferably higher than $Tg_B+5°$ C., and still more preferably higher than $Tg_B+10°$ C., and lower than higher one of the temperatures $Tg_A$ and $Tg_C$ plus 40° C., and more preferably lower than the higher one of the temperatures $Tg_A$ and $Tg_C$ plus 20° C. When the temperature T1 is higher than the lower limit of the aforementioned temperature range, the phase differences Reb and Rtb of the resin layer (b) can stably be set within desired ranges. When the temperature T1 is lower than the upper limit of the aforementioned temperature range, the phase differences Rea and Rta of the resin layer (a), and the phase differences Rec and Rtc of the resin layer (c) can stably be set within desired ranges.

Uniaxial stretching may be carried out by methods publicly known in the prior art. Examples of the method may include a method of uniaxial stretching in the lengthwise direction (that usually matches the MD direction) utilizing the difference in peripheral speed between rolls; and a method of uniaxial stretching in the crosswise direction (usually matches the TD direction.) using a tenter. Examples of the method of uniaxial stretching in the lengthwise direction may include an IR heating method and a float method between rolls. Among them, the float method is preferable in high optical uniformity of the resulting the phase difference plate. On the other hand, examples of the method of uniaxial stretching in the crosswise direction may include a tenter method.

In stretching, a temperature variation may be provided along the width direction of the film in a stretching zone to reduce stretching unevenness and thickness unevenness. In order to provide the temperature variation along the width direction of the film in the stretching zone, publicly known techniques may be used, such as adjusting the degree of opening of warm air nozzles in the width direction, and arranging IR heaters in the width direction for heating control.

[1-3. Second Stretching Step]

The second stretching step is carried out after the first stretching step. In the second stretching step, the layered body for manufacturing a phase difference plate which has been stretched in one direction in the first stretching step is stretched in the direction approximately orthogonal to the stretching direction of the first stretching step. As used herein, in the present invention, the expression "approximately orthogonal" means that the formed angle is usually 85° or more and preferably 89° or more, and usually 95° or less and preferably 91° or less.

In the second stretching step, the layered body for manufacturing a phase difference plate is stretched at the temperature T2 which is lower than the temperature T1. That is, the layered body for manufacturing a phase difference plate is uniaxially stretched at the relatively low temperature T2. Stretching at the temperature T2 causes phase difference in each of the resin layers (a) to (c) depending on, e.g., the configuration of the layered body for manufacturing a phase difference plate, the stretching temperature T2, and the stretching ratio. The stretching also causes phase difference of the entire layered body for manufacturing a phase difference plate including the resin layers (a) to (c). In this case, for example, if the layered body for manufacturing a phase difference plate satisfies the requirement P, the phase of XZ polarized light relative to YZ polarized light will be advanced by stretching in the second stretching step when the phase of XZ polarized light relative to YZ polarized light is retarded by stretching in the first stretching step, and the phase of XZ polarized light relative to YZ polarized light will be retarded by stretching in the second stretching step when the phase of XZ polarized light relative to YZ polarized light is advanced by stretching in the first stretching step.

On the basis of the glass transition temperature $Tg_B$ of the resin B, the temperature T2 is preferably higher than $Tg_B-20°$ C. and more preferably higher than $Tg_B-10°$ C., and preferably lower than $Tg_B+5°$ C. and more preferably lower than $Tg_B$. When the stretching temperature T2 is higher than the lower limit of the aforementioned temperature range, the layered body for manufacturing a phase difference plate can be prevented from being fractured or being cloudy in stretching. When the stretching temperature T2 is lower than the upper limit of the aforementioned temperature range, the phase differences Reb and Rtb of the resin layer (b) can stably be set within desired ranges.

The difference between the temperature T1 and the temperature T2 is usually 5° C. or more, and preferably 10° C. or more. Such a large difference between the temperature T1 and the temperature T2 allows stable expression of the polarizing plate compensation function of the phase difference plate. The upper limit of the difference between the temperature T1 and the temperature T2 is not limited, although it is 100° C. or less in view of industrial productivity.

In uniaxial stretching in the second stretching step, the same method as employed in uniaxial stretching in the first stretching step may be applied. However, uniaxial stretching in the second stretching step is preferably carried out at a smaller stretching ratio than that in uniaxial stretching in the first stretching step. Specifically, it is preferable that the stretching ratio in the first stretching step is 2 to 4 times and the stretching ratio in the second stretching step is 1.1 to 2 times.

Examples of combination of the stretching directions in the first stretching step and the second stretching step may include: stretching in the lengthwise direction in the first stretching step and stretching in the crosswise direction in the second stretching step; stretching in the crosswise direction in the first stretching step and stretching in the lengthwise direction in the second stretching step; and stretching in a diagonal direction in the first stretching step and stretching in a diagonal direction approximately orthogonal thereto in the second stretching step. Among them, stretching in the crosswise direction in the first stretching step and stretching in the lengthwise direction in the second stretching step are preferable. This is because stretching in the lengthwise direction in the second stretching step at a smaller stretching ratio can reduce fluctuation in the direction of the optical axis over the full width of the obtained phase difference plate.

By subjecting the layered body for manufacturing a phase difference plate to the first stretching step and the second stretching step in the aforementioned manner, each of the first stretching step and the second stretching step gives phase difference to the resin layer (a) and the resin layer (b) depending on, e.g., the stretching temperature, the stretching direction, and the stretching ratio. Accordingly, in the phase difference plate of the present invention which is obtained after the first stretching step and the second stretching step, phase difference which is sufficient to express optical functions such as polarizing plate compensation function will be generated as a combination of phase differences generated in the resin layers (a) to (c) in of the respective first stretching step and second stretching step.

In the aforementioned method for manufacturing the phase difference plate, the steps are simpler than the prior art methods, and therefore improved productivity can be expected.

For example, in the technique described in Patent Literature 1, a desired phase difference plate was obtained by imparting shrinking force to a resin film by a shrink film, which requires complicated control of the direction and the degree of shrinkage. In addition, in the method using the shrink film, the magnitude of the shrinking force varied with, e.g., the thickness of the shrink film and the conditions of shrinking, so that it was difficult to adjust accuracy of shrinkage and to manufacture a phase difference plate having a broad width. In contrast thereto, the aforementioned method for manufacturing the phase difference plate may be performed merely by stretching of the layered body for manufacturing a phase difference plate. Therefore the method is an easy manufacturing method with simple steps. Furthermore, since the aforementioned method for manufacturing phase difference plates does not require shrinking but only requires stretching, and the accuracy of stretching is relatively easily adjusted, the aforementioned method readily realizes a phase difference plate having a broad width.

Alternatively, it is conceivable to manufacture a phase difference plate having the polarizing plate compensation function by, e.g., separately preparing films having different phase differences and then bonding the films to each other. However, such a method requires precise adjustment of bonding angle, and such adjustment was complicated. When an adhesive is used for bonding, the device and the time are required for curing the adhesive, which was complicated. In contrast thereto, the aforementioned method for manufacturing the phase difference plate does not require adjustment of the bonding angle since the layered body for manufacturing a phase difference plate is prepared before stretching. Therefore, the aforementioned manufacturing method requires less effort and can be performed in simple manner, whereby improved productivity can be expected. Furthermore, because of the absence of the necessity of bonding angle adjustment, the accuracy of the direction of the slow axis can be easily improved and higher quality of the product can be expected.

[1-4. Other Steps]

In the method for manufacturing the phase difference plate of the present invention, other steps may be carried out in addition to the aforementioned first stretching step and second stretching step.

For example, before stretching the layered body for manufacturing a phase difference plate, a step of preheating the layered body for manufacturing a phase difference plate (preheating step) may be provided. Examples of means for heating the layered body for manufacturing a phase difference plate may include an oven-type heating device, a radiation heating device, and soaking in a liquid. Among them, the oven-type heating device is preferable. The heating temperature in the preheating step is usually the stretching temperature minus 40° C. or higher and preferably the stretching temperature minus 30° C. or higher, and usually the stretching temperature plus 20° C. or lower, and preferably the stretching temperature plus 15° C. or lower. The stretching temperature means the preset temperature of the heating device.

In addition, for example, the stretched film may be subjected to a fixing process after the first stretching step and/or the second stretching step. The temperature in the fixing process is usually a room temperature or higher, preferably the stretching temperature minus 40° C. or higher, and usually the stretching temperature plus 30° C. or lower, preferably the stretching temperature plus 20° C. or lower.

[2. Phase Difference Plate of the Present Invention]

The phase difference plate of the present invention is obtained by the aforementioned manufacturing method.

As the phase difference plate obtained after the aforementioned first stretching step and second stretching step, the following two embodiments are conceivable depending on the stretching conditions of each stretching step: (1) an embodiment in which the slow axis of the resin layer (a) after stretching, the slow axis of the resin layer (b) after stretching, and the slow axis of the resin layer (c) after stretching are approximately parallel to one another; and (2) an embodiment in which the slow axes of the resin layer (a) and the resin layer (c) after stretching are approximately orthogonal to the slow axis of the resin layer (b) after stretching. In the present invention, (1) the slow axis of the resin layer (a) after stretching, the slow axis of the resin layer (b) after stretching, and the slow axis of the resin layer (c) after stretching are approximately parallel to one another. In the present invention, the expression "approximately parallel" means that the formed angle is 0° (i.e., precisely parallel) and, in addition, the formed angle is within the range of ±5°, and preferably within the range of ±1°.

In one embodiment of the phase difference plate of the present invention, the phase difference plate has the layered structure including at least the resin layer (a) containing the resin A and the resin layer (b) containing the resin B, in which the in-plane retardation Rea and the NZ coefficient NZa of the resin layer (a) after the stretching treatment (i.e., after both the first stretching step and the second stretching step), and the in-plane retardation Reb and the NZ coefficient NZb of the resin layer (b) after the stretching treatment satisfy the following Formulae 1 to 4. In this case, the slow axis of the resin layer (a) after the stretching treatment, and the slow axis of the resin layer (b) after the stretching treatment are approximately parallel to each other.

$30 \text{ nm} < Rea < 60 \text{ nm}$  Formula 1

$2.0 < NZa < 5.0$  Formula 2

$60 \text{ nm} < Reb < 90 \text{ nm}$  Formula 3

$-2.0 < NZb < -0.5$  Formula 4

Formulae 1 to 4 will be described in more detail hereinbelow.

In the phase difference plate of the present invention, the in-plane retardation Rea of the resin layer (a) is usually more than 30 nm and preferably more than 40 nm, and usually less than 60 nm and preferably less than 50 nm.

In the phase difference plate of the present invention, the NZ coefficient NZa of the resin layer (a) is usually more than 2.0 and preferably more than 2.5, and usually less than 5.0 and preferably less than 4.0.

In the phase difference plate of the present invention, the in-plane retardation Reb of the resin layer (b) is usually more than 60 nm and preferably more than 65 nm, and usually less than 90 nm and preferably less than 85 nm.

In the phase difference plate of the present invention, the NZ coefficient NZb of the resin layer (b) is usually more than −2.0 and preferably more than −1.5, and usually less than −0.5 and preferably less than −0.6.

In another embodiment of the phase difference plate of the present invention, the phase difference plate has the layered structure including at least the resin layer (a) containing the resin A, the resin layer (b) containing the resin B, and the resin layer (c) containing the resin C, in which the in-plane retardation Rea and the NZ coefficient NZa of the resin layer (a) after the stretching treatment, the in-plane retardation Reb and the NZ coefficient NZb of the resin layer (b) after the stretching treatment, and the in-plane retardation Rec and the NZ coefficient NZc of the resin layer (c) after the stretching treatment satisfy the following Formulae 5 to 10. In this case, the slow axes of the resin layer (a) after the stretching treatment and the resin layer (c) after the stretching treatment are approximately parallel to the slow axis of the resin layer (b) after the stretching treatment.

$30 \text{ nm} < Rea < 60 \text{ nm}$  Formula 5

$2.0 < NZa < 5.0$  Formula 6

$70 \text{ nm} < Reb < 110 \text{ nm}$  Formula 7

$-2.0 < NZb < -0.5$  Formula 8

$10 \text{ nm} < Rec < 30 \text{ nm}$  Formula 9

$2.0 < NZc < 5.0$  Formula 10

Formulae 5 to 10 will be described in more detail hereinbelow.

In the phase difference plate of the present invention, the in-plane retardation Rea of the resin layer (a) is usually more than 30 nm and preferably more than 40 nm, and usually less than 60 nm and preferably less than 50 nm.

In the phase difference plate of the present invention, the NZ coefficient NZa of the resin layer (a) is usually more than 2.0 and preferably more than 2.5, and usually less than 5.0 and preferably less than 4.0.

In the phase difference plate of the present invention, the in-plane retardation Reb of the resin layer (b) is usually more than 70 nm and preferably more than 80 nm, and usually less than 110 nm and preferably less than 100 nm.

In the phase difference plate of the present invention, the NZ coefficient NZb of the resin layer (b) is usually more than −2.0 and preferably more than −1.5, and usually less than −0.5 and preferably less than −0.6.

In the phase difference plate of the present invention, the in-plane retardation Rec of the resin layer (c) is usually more than 10 nm and preferably more than 12 nm, and usually less than 30 nm and preferably less than 28 nm.

In the phase difference plate of the present invention, the NZ coefficient NZc of the resin layer (c) is usually more than 2.0 and preferably more than 2.5, and usually less than 5.0 and preferably less than 4.0.

In the aforementioned two embodiments, by setting the in-plane retardation Rea and the NZ coefficient NZa of the resin layer (a), the in-plane retardation Reb and the NZ coefficient NZb of the resin layer (b), and the in-plane retardation Rec and the NZ coefficient NZc of the resin layer (c) within the aforementioned ranges, the phase difference plate of the present invention can exert the polarizing plate compensation function. These Rea, NZa, Reb, NZb, Rec, and NZc may be adjusted by controlling, for example, the thicknesses of the resin layer (a), the resin layer (b), and the resin layer (c) in the step of forming the layered body, and the stretching ratio and the stretching temperature in the first stretching step and the second stretching step.

The in-plane retardation (Rea, Reb, Rec) of each layer are the values represented by $|Nx-Ny| \times Th$ (wherein Nx represents the refractive index in the direction which is perpendicular to the thickness direction (an in-plane direction) and gives the maximum refractive index, Ny represents the refractive index in the direction which is perpendicular to the thickness direction (an in-plane direction) and orthogonal to Nx, and Th represents the thickness). The NZ coefficients (NZa, NZb, and NZc) are the values represented by (Nx−Nz)/(Nx−Ny) (wherein Nx represents the refractive index in the direction which is perpendicular to the thickness direction (an in-plane direction) and gives the maximum refractive index, Ny represents the refractive index in the direction which is perpendicular to the thickness direction (an in-plane direction) and orthogonal to Nx, and Nz represents the refractive index in the thickness direction). Each retardation is evaluated for the light having a wavelength of 550 nm.

The aforementioned retardation of each layer may be calculated by obtaining Nx, Ny, and Nz using the spectroscopic ellipsometer M-2000U produced by J. A. Woollam while the phase difference plate is brought into a monolayer state by polishing the surface thereof with a polishing cloth for plastics.

The phase difference plate of the present invention may be those which shrink in the lengthwise direction and in the crosswise direction when subjected to heat treatment at 60° C. and 90% RH for 100 hours. However, the shrinkage ratio is preferably 0.5% or less, and more preferably 0.3% or less. An excessive shrinkage ratio may cause deformation of the phase difference plate of the present invention due to shrinkage stress and the phase difference plate may be separated from the display device when the phase difference plate is used under a high-temperature/high-humidity environment.

The thickness of the phase difference plate of the present invention is preferably 10 μm or more and more preferably 30 μm or more, and preferably 200 μm or less and more preferably 150 μm or less in terms of the total thickness of the resin layers (a) to (c). Moreover, the thickness fluctuation of the resin layers (a) to (c) is preferably 1 μm or less on the entire surface. With this feature, fluctuation in the color tone can be reduced. Further, with this feature, uniform tone change after long-term use can be achieved. This feature may be realized by, in the layered body for manufacturing a phase difference plate, controlling the thickness fluctuation of the resin layers (a) to (c) to be 1 μm or less on the entire surface.

The phase difference plate of the present invention is the same as the layered body for manufacturing a phase difference plate in terms of the total light transmittance, haze, ΔYI, and JIS pencil hardness as well as in that the outer surface is preferably flat with substantially no linear recess and linear projection.

The phase difference plate of the present invention may have a layer other than the resin layers (a) to (c). Examples of other layers may include the same layers as described in the section of the layered body for manufacturing a phase difference plate.

The phase difference plate of the present invention may have a size of 1500 mm to 2000 mm in width direction.

[3. Liquid Crystal Display Device]

The phase difference plate of the present invention has an excellent polarizing plate compensation function and therefore it may be applied to a liquid crystal display device as it is alone or in combination with another member.

The liquid crystal display device usually comprises a pair of polarizers (a light incident side polarizer and a light emitting side polarizer) having absorption axes approximately orthogonal to each other and a liquid crystal cell interposed between the pair of polarizers. When the phase difference plate of the present invention is provided to the liquid crystal display device, the phase difference plate of the present invention is interposed between the pair of polarizers. In this case, the phase difference plate of the present invention may be provided on the light incident side of the liquid crystal cell, may be provided on the light emitting side of the liquid crystal cell, or may be provided on both the light incident side and the light emitting side of the liquid crystal cell. Usually, the pair of polarizers, the phase difference plate of the present invention, and the liquid crystal cell are integrally provided as a liquid crystal panel, and this liquid crystal panel is irradiated with light from a light source to display an image on a display surface on the light emitting side of the liquid crystal panel. In this case, the phase difference plate of the present invention exerts an excellent polarizing plate compensation function. Thus it is thereby possible to reduce light leakage when the display surface of the liquid crystal display device is viewed from the oblique direction. Furthermore, the phase difference plate of the present invention usually has an excellent optical function in addition to the polarizing plate compensation function, so that the visibility of the liquid crystal display device can be further improved.

Examples of the drive mode of the liquid crystal cell may include an in-plane switching (IPS) mode, a vertical alignment (VA) mode, a multi-domain vertical alignment (MVA) mode, a continuous pinwheel alignment (CPA) mode, a hybrid alignment nematic (HAN) mode, a twisted nematic (TN) mode, a super-twisted nematic (STN) mode, and an optically compensated bend (OCB) mode. Among them, the in-plane switching mode and vertical alignment mode are preferable, and the in-plane switching mode is particularly preferable. The liquid crystal cell of the in-plane switching mode has a wide viewing angle. By applying the phase difference plate of the present invention, its viewing angle can further be widened.

The phase difference plate of the present invention may be bonded to the liquid crystal cell or the polarizer. For bonding, a publicly known adhesive may be used.

One sheet of the phase difference plate of the present invention may be used alone, or two or more sheets thereof may be used.

Moreover, when the phase difference plate of the present invention is provided to the liquid crystal display device, it may be used in combination with another phase difference plate. For example, when the phase difference plate of the present invention is provided to a liquid crystal display device including a liquid crystal cell with a vertical alignment mode, another phase difference plate for improving viewing angle characteristics may be interposed between the pair of polarizers in addition to the phase difference plate of the present invention.

[1-4. Other Matters]

The phase difference plate of the present invention may also be used for applications other than those mentioned above.

For example, the phase difference plate of the present invention may be formed as a ¼ wave plate by setting the in-plane retardation Re of the phase difference plate of the present invention to 120 nm to 160 nm. This ¼ wave plate may be combined with a linear polarizer to be a circularly polarizing plate. In this case, the angle formed by the slow axis of the ¼ wave plate and the absorption axis of the linear polarizer is preferably 45±2°.

The phase difference plate of the present invention may also be used as a protective film of the polarizing plate. A polarizing plate usually comprises a polarizer and protective films bonded to both sides thereof. When the phase difference plate of the present invention is bonded to the polarizer, the phase difference plate of the present invention may be used as a protective film. In this case, the liquid crystal display device can be made thinner since the protective film is omitted.

In the liquid crystal display device of the present invention, the omnidirectional contrast is 50 or higher, more preferably 80 or higher, and still more preferably 150 or higher. Having such a value of the omnidirectional contrast, it is possible to improve the display quality when viewed from the oblique direction. When the omnidirectional contrast is relatively low (for example, about 50), as described in the above, it is possible to obtain an embodiment which exerts color taste improving effect on the display screen which is in a trade-off relationship with improvement in contrast.

EXAMPLES

The present invention will be specifically described hereinbelow referring to Examples, but the present invention is not limited to the following Examples and may be arbitrarily modified and practiced without departing from the scope of the claims of the present invention. In Examples and Comparative Examples, the polarizing plate (produced by SANRITZ CORPORATION, LLC2-9518) was used as a polarizer. The liquid crystal cell used was the one which has a thickness of 3.349 µm, a birefringence of $\Delta n=0.11$ at the wavelength of 550 nm, and a pretilt angle of 0°.

[Evaluation Method]
(1) Method for Measuring Thickness

Thickness of the film was measured using a contact-type thickness meter.

Thickness of each layer constituting the film was measured by embedding the film in epoxy resin, then slicing with a microtome (produced by YAMATO KOGYO Co., Ltd., product name "RUB-2100"), and observing the cross section of the sliced film with a scanning electron microscope.

(2) Method for Measuring Retardation and NZ Coefficient

For measuring in-plane phase difference and phase difference in the thickness direction of each layer constituting a phase difference plate, the refractive index Nx in the lengthwise direction, the refractive index Ny in the width direction, and the refractive index Nz in the thickness direction of each layer are each obtained at a measurement wavelength of 550 nm using the spectroscopic ellipsometer M-2000U produced by J. A. Woollam while the phase difference plate is brought into a monolayer state by polishing the surface thereof with a polishing cloth for plastics. Then, these obtained values and the thickness Th (nm) of each layer were used to calculate the in-plane phase differences (Rea, Reb, Rec) and the NZ coefficients (NZa, NZb, NZc) in accordance with the following formulae.

$Rea(Reb,Rec)=|Nx-Ny|\times Th$ $NZa(NZb,NZc)=(Nx-Nz)/(Nx-Ny)$ (3) Viewing Angle Characteristics of Liquid Crystal Display Device The obtained phase difference plate is disposed at a position adjacently contacting the liquid crystal cell of a liquid crystal display device of an in-plane switching (IPS) mode, display characteristics are visually observed. Furthermore, the contrast is calculated by optical simulation using a 4×4 matrix and shown as a contrast map.

Preparative Example 1

A film forming apparatus for two-material two-layer co-extrusion molding was prepared, and pellets of polycarbonate resin (produced by Asahi Kasei Corporation, Wonderlite PC-115, glass transition temperature of 145° C.) were charged into one of the uniaxial extruders having a double flight type screw, and then melted.

Pellets of styrene-maleic anhydride copolymer resin (produced by Nova Chemicals, Dylark D332, glass transition temperature of 135° C.) were charged into the other uniaxial extruder having a double flight type screw, and then melted. The total light transmittance of the aforementioned polycarbonate resin with a thickness of 1 mm is 90%, and the total light transmittance of the aforementioned styrene-maleic anhydride copolymer resin with a thickness of 1 mm is 89%.

The melted polycarbonate resin at 260° C. was supplied into one of the manifolds of a multi-manifold die (surface roughness Ra of a die lip: 0.1 µm) through a leaf disk shaped polymer filter having openings of 10 µm. The melted styrene-maleic anhydride copolymer resin at 260° C. was supplied into the other manifold through a leaf disk shaped polymer filter having openings of 10 µm.

The polycarbonate resin and the styrene-maleic anhydride copolymer resin were co-extruded from the multi-manifold die at 260° C. to be in a film shape with a two-layer configuration consisting of a polycarbonate resin layer/a styrene-maleic anhydride copolymer resin layer. The film-shaped melted resin was cast onto a cooling roll having a surface temperature adjusted to 130° C. and then passed between two cooling rolls having a surface temperature adjusted to 50° C. to obtain a layered body 1. The casting of the film-shaped melted resin onto the cooling roll was performed such that the polycarbonate resin layer was formed on the surface of the cooling roll. The layered body 1 is a layered body 1 for manufacturing a phase difference plate which consists of the polycarbonate resin layer (resin layer (a): 19 µm) and the styrene-maleic anhydride copolymer resin layer (resin layer (b): 144 µm), and has a width of 1350 mm and a thickness of 163 µm (co-extrusion step).

Preparative Example 2

A layered body 2 for manufacturing a phase difference plate was obtained by the similar procedure to that of Preparative Example 1, in which the thickness thereof was the only different point. The layered body 2 for manufacturing a phase difference plate consisted of a polycarbonate resin layer (resin layer (a): 16 µm) and a styrene-maleic anhydride copolymer resin layer (resin layer (b): 142 µm), and had a width of 1350 mm and a thickness of 158 µm.

Preparative Example 3

A layered body 3 for manufacturing a phase difference plate was obtained by the similar procedure to that of Preparative Example 1, in which the thickness thereof was the only different point. The layered body 3 for manufacturing a phase difference plate consisted of a polycarbonate resin layer (resin layer (a): 16 µm) and a styrene-maleic anhydride copolymer resin layer (resin layer (b): 125 µm), and had a width of 1350 mm and a thickness of 141 µm.

Preparative Example 4

A layered body 4 for manufacturing a phase difference plate was obtained by the similar procedure to that of Preparative Example 1, in which the thickness thereof was the only different point. The layered body 4 for manufacturing a phase difference plate consisted of a polycarbonate resin layer (resin layer (a): 9 µm) and a styrene-maleic anhydride copolymer resin layer (resin layer (b): 142 µm), and had a width of 1350 mm and a thickness of 151 µm.

Preparative Example 5

A layered body 5 for manufacturing a phase difference plate was obtained by the similar procedure to that of Preparative Example 1, in which the thickness thereof was the only different point. The layered body 5 for manufacturing a phase difference plate consisted of a polycarbonate resin layer (resin layer (a): 24 μm) and a styrene-maleic anhydride copolymer resin layer (resin layer (b): 142 μm), and had a width of 1350 mm and a thickness of 166 μm.

Preparative Example 6

A layered body 6 for manufacturing a phase difference plate was obtained by the similar procedure to that of Preparative Example 1, in which the thickness thereof was the only different point. The layered body 6 for manufacturing a phase difference plate consisted of a polycarbonate resin layer (resin layer (a): 16 μm) and a styrene-maleic anhydride copolymer resin layer (resin layer (b): 109 μm), and had a width of 1350 mm and a thickness of 125 μm.

Preparative Example 7

A layered body 7 for manufacturing a phase difference plate was obtained by the similar procedure to that of Preparative Example 1, in which the thickness thereof was the only different point. The layered body 7 for manufacturing a phase difference plate consisted of a polycarbonate resin layer (resin layer (a): 16 μm) and a styrene-maleic anhydride copolymer resin layer (resin layer (b): 192 μm), and had a width of 1350 mm and a thickness of 208 μm.

Preparative Example 8

A layered body 8 for manufacturing a phase difference plate was obtained by the similar procedure to that of Preparative Example 1, in which the thickness thereof was the only different point. The layered body 8 for manufacturing a phase difference plate consisted of a polycarbonate resin layer (resin layer (a): 9 μm) and a styrene-maleic anhydride copolymer resin layer (resin layer (b): 109 μm), and had a width of 1350 mm and a thickness of 118 μm.

Preparative Example 9

A layered body 9 for manufacturing a phase difference plate was obtained by the similar procedure to that of Preparative Example 1, in which the thickness thereof was the only different point. The layered body 9 for manufacturing a phase difference plate consisted of a polycarbonate resin layer (resin layer (a): 24 μm) and a styrene-maleic anhydride copolymer resin layer (resin layer (b): 192 μm), and had a width of 1350 mm and a thickness of 216 μm.

Example 1

The layered body 1 obtained in Preparative Example 1 was supplied to a tenter crosswise uniaxial stretching machine and stretched in the crosswise direction at a stretching temperature of 155° C. and a stretching ratio of 3.5 (first stretching step). Subsequently, the stretched film was supplied to a lengthwise uniaxial stretching machine and stretched in the lengthwise direction at a stretching temperature of 127° C. and a stretching ratio of 1.2 to obtain a phase difference plate 1 (second stretching step).

In the obtained phase difference plate 1, the slow axis of the resin layer (a) and the slow axis of the resin layer (b) were approximately parallel to each other. Furthermore, as to the obtained phase difference plate 1, the in-plane retardation Rea and the NZ coefficient NZa of the resin layer (a), and the in-plane retardation Reb and the NZ coefficient NZb of the resin layer (b) were measured. The results are shown in Table 2. The obtained phase difference plate 1 satisfied Formulae 1 to 4.

Figure 2:
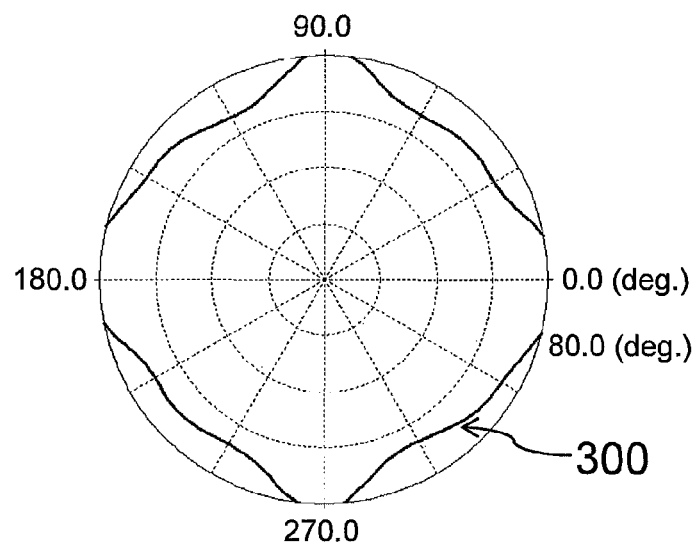
FIG. 2 is a contrast contour map measured in Example 1 of the present invention.

Moreover, the obtained phase difference plate 1 was disposed at a position adjacently contacting a liquid crystal cell of a liquid crystal display device of an IPS mode to visually evaluate display characteristics. As a result, the display was favorable and uniform when the screen was viewed from the front direction, and even when viewed from the oblique directions within 80 degrees with respect to the polar angle in all azimuth directions. As to this liquid crystal display device, the contrast obtained by optical simulation using a 4×4 matrix is shown in Table 2 and the contrast contour map is shown in FIG. 2.

Example 2

The layered body 2 obtained in Preparative Example 2 was supplied to a tenter crosswise uniaxial stretching machine and stretched in the crosswise direction at a stretching temperature of 155° C. and a stretching ratio of 2.8 (first stretching step). Subsequently, the stretched film was supplied to a lengthwise uniaxial stretching machine and stretched in the lengthwise direction at a stretching temperature of 128° C. and a stretching ratio of 1.2 to obtain a phase difference plate 2 (second stretching step).

In the obtained phase difference plate 2, the slow axis of the resin layer (a) and the slow axis of the resin layer (b) were approximately parallel to each other. Furthermore, as to the obtained phase difference plate 1, the in-plane retardation Rea and the NZ coefficient NZa of the resin layer (a), and the in-plane retardation Reb and the NZ coefficient NZb of the resin layer (b) were measured. The results are shown in Table 2. The obtained phase difference plate 2 satisfied Formulae 1 to 4.

Figure 3:
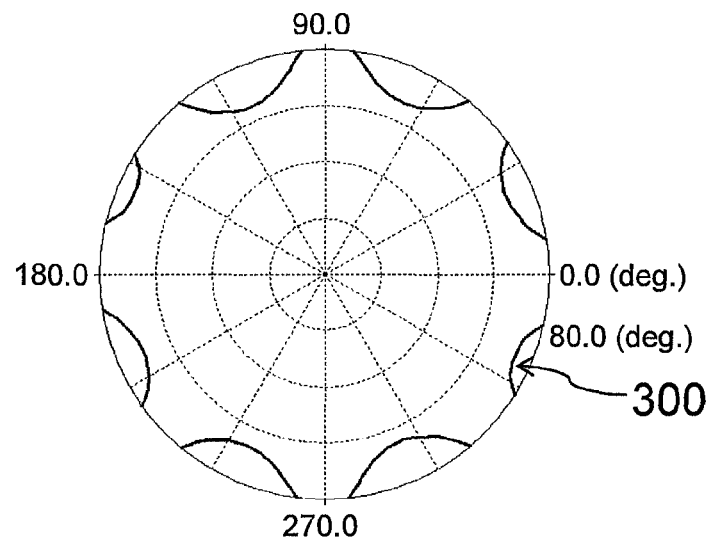
FIG. 3 is a contrast contour map measured in Example 2 of the present invention.

Moreover, the obtained phase difference plate 2 was disposed at a position adjacently contacting a liquid crystal cell of a liquid crystal display device of an IPS mode to visually evaluate display characteristics. As a result, the display was favorable and uniform when the screen was viewed from the front direction, and even when viewed from the oblique directions within 80 degrees with respect to the polar angle in all azimuth directions. As to this liquid crystal display device, the contrast obtained by optical simulation using a 4×4 matrix is shown in Table 2 and the contrast contour map is shown in FIG. 3.

Example 3

The layered body 3 obtained in Preparative Example 3 was supplied to a tenter crosswise uniaxial stretching machine and stretched in the crosswise direction at a stretching temperature of 155° C. and a stretching ratio of 2.8 (first stretching step). Subsequently, the stretched film was supplied to a lengthwise uniaxial stretching machine and stretched in the lengthwise direction at a stretching temperature of 128° C. and a stretching ratio of 1.25 to obtain a phase difference plate 3 (second stretching step).

In the obtained phase difference plate 3, the slow axis of the resin layer (a) and the slow axis of the resin layer (b) were approximately parallel to each other. Furthermore, as to the obtained phase difference plate 3, the in-plane retardation Rea and the NZ coefficient NZa of the resin layer (a), and the in-plane retardation Reb and the NZ coefficient NZb of the resin layer (b) were measured. The results are shown in Table 2. The obtained phase difference plate 3 satisfied Formulae 1 to 4.

Figure 4:
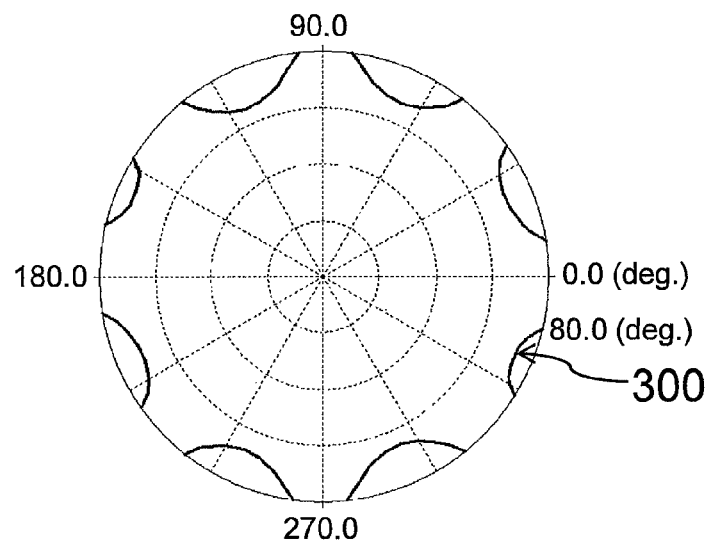
FIG. 4 is a contrast contour map measured in Example 3 of the present invention.
Figure 5:
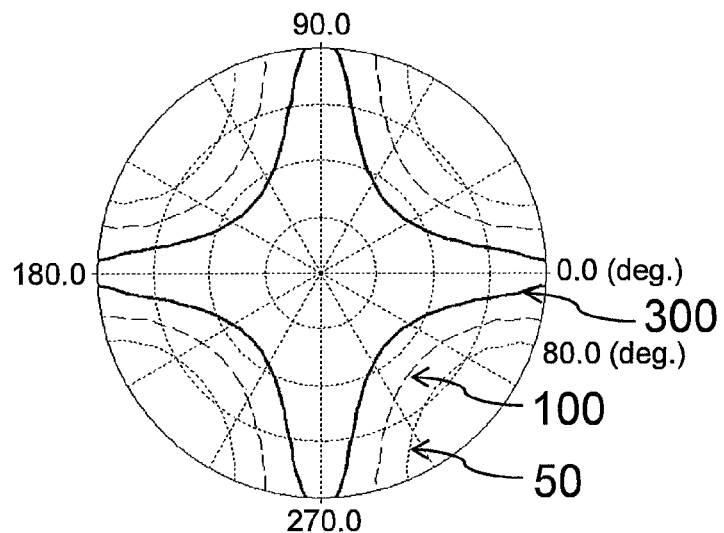
FIG. 5 is a contrast contour map measured in Comparative Example 1.
Figure 8:
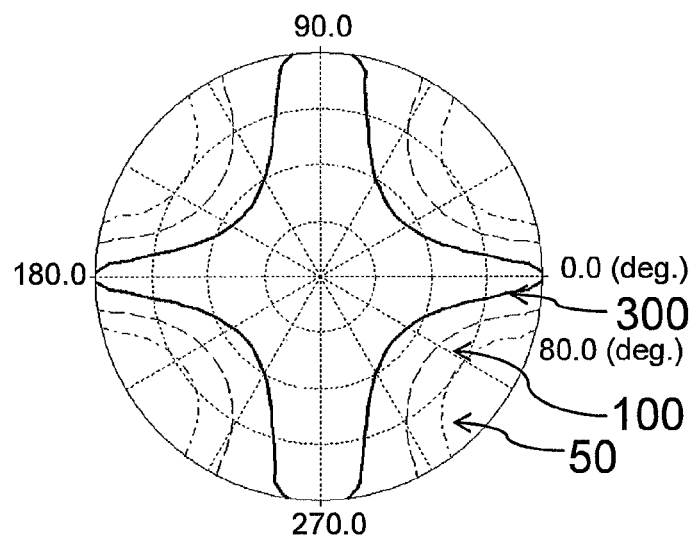
FIG. 8 is a contrast contour map measured in Comparative Example 4.
Figure 9:
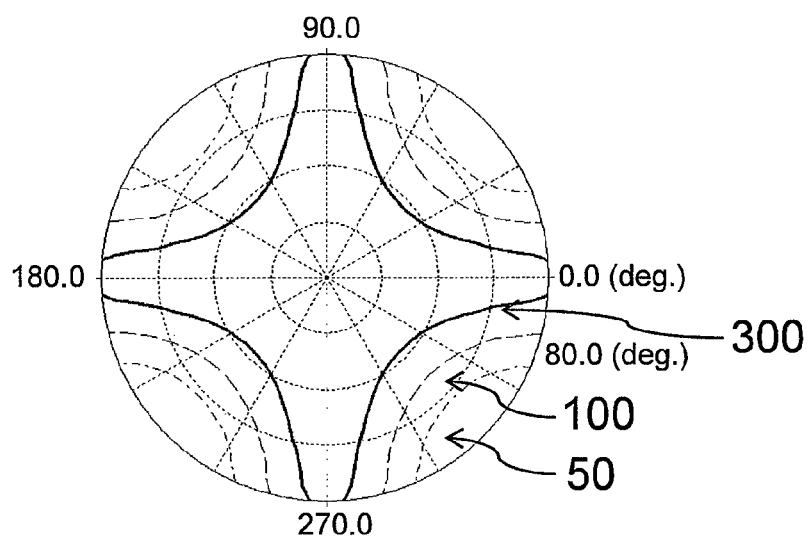
FIG. 9 is a contrast contour map measured in Comparative Example 5.
Figure 10:
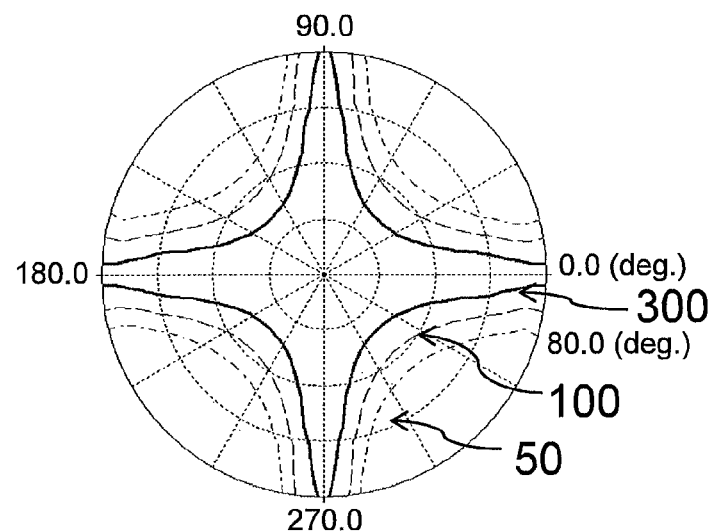
FIG. 10 is a contrast contour map measured in Comparative Example 6.

Moreover, the obtained phase difference plate 3 was disposed at a position adjacently contacting a liquid crystal cell of a liquid crystal display device of an IPS mode to visually evaluate display characteristics. As a result, the display was favorable and uniform when the screen was viewed from the front direction, and even when viewed from the oblique directions within 80 degrees with respect to the polar angle in all azimuth directions. As to this liquid crystal display device, the contrast obtained by optical simulation using a 4×4 matrix is shown in Table 2 and the contrast contour map is shown in FIG. 4.

Comparative Examples 1 to 6

Each of the layered bodies 4 to 9 obtained in Preparative Examples 4 to 9 was supplied to a tenter crosswise uniaxial stretching machine and stretched in the crosswise direction at a stretching temperature of 155° C. and a stretching ratio of 2.8 (first stretching step). Subsequently, each of the stretched films was supplied to a lengthwise uniaxial stretching machine and stretched in the lengthwise direction at a stretching temperature of 128° C. and a stretching ratio of 1.2 to obtain phase difference plates 4 to 9 (second stretching step).

In the obtained phase difference plates 4 to 9, the slow axis of the resin layer (a) and the slow axis of the resin layer (b) were approximately parallel to each other. Furthermore, as to the obtained phase difference plates 4 to 9, the in-plane retardation Rea and the NZ coefficient NZa of the resin layer (a), and the in-plane retardation Reb and the NZ coefficient NZb of the resin layer (b) were measured. The results are shown in Table 2. The obtained phase difference plates 4 to 9 did not satisfy Formulae 1 to 4.

Moreover, the obtained phase difference plates 4 to 9 were visually evaluated for their display characteristics in the aforementioned manner. As a result, light leaking was observed when the screen was viewed from the oblique directions within 80 degrees with respect to the polar angle. In addition, as to the phase difference plates 4 to 9, remarkable color unevenness was observed and display was ununiform. As to these liquid crystal display devices, the contrasts obtained by optical simulation using a 4×4 matrix are shown in Table 2 and the contrast contour maps are shown in FIGS. 5 to 10.

Preparative Example 10

A film forming apparatus for two-material three-layer co-extrusion molding was prepared, and pellets of polycarbonate resin (produced by Asahi Kasei Corporation, Wonderlite PC-110, glass transition temperature of 145° C.) were charged into one of the uniaxial extruders having a double flight type screw, and then melted.

Pellets of styrene-maleic anhydride copolymer resin (produced by Nova Chemicals, Dylark D332, glass transition temperature of 135° C.) were charged into the other uniaxial extruder having a double flight type screw, and then melted.

The melted polycarbonate resin at 260° C. was supplied into one of the manifolds of a multi-manifold die (surface roughness Ra of a die lip: 0.1 μm) through a leaf disk shaped polymer filter having openings of 10 μm. The melted styrene-maleic anhydride copolymer resin at 260° C. was supplied into the other manifold through a leaf disk shaped polymer filter having openings of 10 μm.

The polycarbonate resin and the styrene-maleic anhydride copolymer resin were co-extruded from the multi-manifold die at 260° C. to be in a film shape with a three-layer configuration consisting of a polycarbonate resin layer/a styrene-maleic anhydride copolymer resin layer/a polycarbonate resin layer. The film-shaped melted resin was cast onto a cooling roll having a surface temperature adjusted to 130° C. and then passed between two cooling rolls having a surface temperature adjusted to 50° C. to obtain a layered body 10. The layered body 10 is a layered body 10 for manufacturing a phase difference plate which consists of the polycarbonate resin layer (resin layer (a): 20 μm), the styrene-maleic anhydride copolymer resin layer (resin layer (b): 172 μm), and the polycarbonate resin layer (resin layer (a): 7 μm), and has a width of 1350 mm and a thickness of 199 μm (co-extrusion step).

Preparative Example 11

A layered body 11 for manufacturing a phase difference plate was obtained by the similar procedure to that of Preparative Example 10, in which the thickness thereof was the only different point. The layered body 11 for manufacturing a phase difference plate consisted of a polycarbonate resin layer (resin layer (a): 17 μm), a styrene-maleic anhydride copolymer resin layer (resin layer (b): 184 μm), and a polycarbonate resin layer (resin layer (c): 9 μm), and had a width of 1350 mm and a thickness of 210 μm.

Preparative Example 12

A layered body 12 for manufacturing a phase difference plate was obtained by the similar procedure to that of Preparative Example 10, in which the thickness thereof was the only different point. The layered body 12 for manufacturing a phase difference plate consisted of a polycarbonate resin layer (resin layer (a): 17 μm), a styrene-maleic anhydride copolymer resin layer (resin layer (b): 178 μm), and a polycarbonate resin layer (resin layer (c): 7 μm), and had a width of 1350 mm and a thickness of 202 μm.

Preparative Example 13

A layered body 13 for manufacturing a phase difference plate was obtained by the similar procedure to that of Preparative Example 10, in which the thickness thereof was the only different point. The layered body 13 for manufacturing a phase difference plate consisted of a polycarbonate resin layer (resin layer (a): 16 μm), a styrene-maleic anhydride copolymer resin layer (resin layer (b): 153 μm), and a polycarbonate resin layer (resin layer (c): 6 μm), and had a width of 1350 mm and a thickness of 175 μm.

Preparative Example 14

A layered body 14 for manufacturing a phase difference plate was obtained by the similar procedure to that of Preparative Example 10, in which the thickness thereof was the only different point. The layered body 14 for manufacturing a phase difference plate consisted of a polycarbonate resin layer (resin layer (a): 24 μm), a styrene-maleic anhydride copolymer resin layer (resin layer (b): 178 μm), and a polycarbonate resin layer (resin layer (c): 7 μm), and had a width of 1350 mm and a thickness of 209 μm.

Preparative Example 15

A layered body 15 for manufacturing a phase difference plate was obtained by the similar procedure to that of Preparative Example 10, in which the thickness thereof was the only different point. The layered body 15 for manufacturing a phase difference plate consisted of a polycarbonate resin layer (resin layer (a): 9 μm), a styrene-maleic anhydride copolymer resin layer (resin layer (b): 178 μm), and a polycarbonate resin layer (resin layer (c): 7 μm), and had a width of 1350 mm and a thickness of 194 μm.

Preparative Example 16

A layered body 16 for manufacturing a phase difference plate was obtained by the similar procedure to that of Preparative Example 10, in which the thickness thereof was the only different point. The layered body 16 for manufacturing a phase difference plate consisted of a polycarbonate resin layer (resin layer (a): 17 μm), a styrene-maleic anhydride copolymer resin layer (resin layer (b): 233 μm), and a polycarbonate resin layer (resin layer (c): 7 μm), and had a width of 1350 mm and a thickness of 257 μm.

Preparative Example 17

A layered body 17 for manufacturing a phase difference plate was obtained by the similar procedure to that of Preparative Example 10, in which the thickness thereof was the only different point. The layered body 17 for manufacturing a phase difference plate consisted of a polycarbonate resin layer (resin layer (a): 17 μm), a styrene-maleic anhydride copolymer resin layer (resin layer (b): 130 μm), and a polycarbonate resin layer (resin layer (c): 7 μm), and had a width of 1350 mm and a thickness of 154 μm.

Preparative Example 18

A layered body 18 for manufacturing a phase difference plate was obtained by the similar procedure to that of Preparative Example 10, in which the thickness thereof was the only different point. The layered body 18 for manufacturing a phase difference plate consisted of a polycarbonate resin layer (resin layer (a): 17 μm), a styrene-maleic anhydride copolymer resin layer (resin layer (b): 178 μm), and a polycarbonate resin layer (resin layer (c): 2 μm), and had a width of 1350 mm and a thickness of 197 μm.

Preparative Example 19

A layered body 19 for manufacturing a phase difference plate was obtained by the similar procedure to that of Preparative Example 10, in which the thickness thereof was the only different point. The layered body 19 for manufacturing a phase difference plate consisted of a polycarbonate resin layer (resin layer (a): 17 μm), a styrene-maleic anhydride copolymer resin layer (resin layer (b): 178 μm), and a polycarbonate resin layer (resin layer (c): 13 μm), and had a width of 1350 mm and a thickness of 208 μm.

Preparative Example 20

A layered body 20 for manufacturing a phase difference plate was obtained by the similar procedure to that of Preparative Example 10, in which the thickness thereof was the only different point. The layered body 20 for manufacturing a phase difference plate consisted of a polycarbonate resin layer (resin layer (a): 24 μm), a styrene-maleic anhydride copolymer resin layer (resin layer (b): 233 μm), and a polycarbonate resin layer (resin layer (c): 7 μm), and had a width of 1350 mm and a thickness of 264 μm.

Preparative Example 21

A layered body 21 for manufacturing a phase difference plate was obtained by the similar procedure to that of Preparative Example 10, in which the thickness thereof was the only different point. The layered body 21 for manufacturing a phase difference plate consisted of a polycarbonate resin layer (resin layer (a): 9 μm), a styrene-maleic anhydride copolymer resin layer (resin layer (b): 130 μm), and a polycarbonate resin layer (resin layer (c): 2 μm), and had a width of 1350 mm and a thickness of 141 μm.

Example 4

The layered body 10 obtained in Preparative Example 10 was supplied to a tenter crosswise uniaxial stretching machine and stretched in the crosswise direction at a stretching temperature of 155° C. and a stretching ratio of 3.5 (first stretching step). Subsequently, the stretched film was supplied to a lengthwise uniaxial stretching machine and stretched in the lengthwise direction at a stretching temperature of 127° C. and a stretching ratio of 1.2 to obtain a phase difference plate 10 (second stretching step).

In the obtained phase difference plate 10, the slow axis of the resin layer (a), the slow axis of the resin layer (b), and the slow axis of the resin layer (c) were approximately parallel to one another. Furthermore, as to the obtained phase difference plate 10, the in-plane retardation Rea and the NZ coefficient NZa of the resin layer (a), the in-plane retardation Reb and the NZ coefficient NZb of the resin layer (b), and the in-plane retardation Rec and the NZ coefficient NZc of the resin layer (c) were measured. The results are shown in Table 2. The obtained phase difference plate 10 satisfied Formulae 5 to 10.

Figure 11:
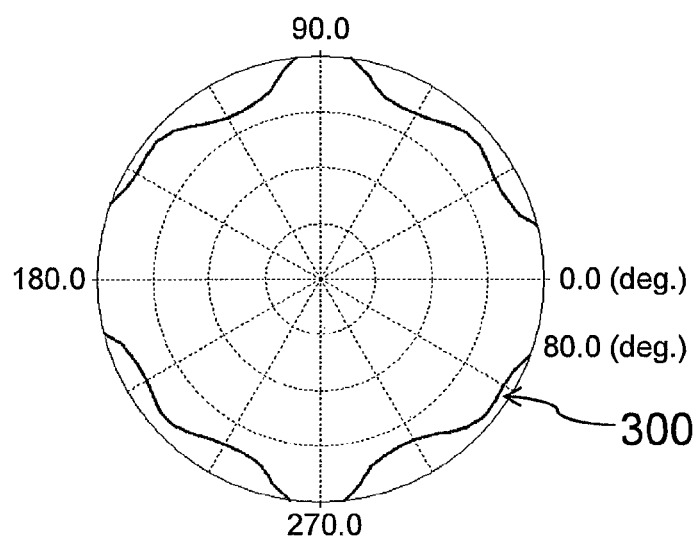
FIG. 11 is a contrast contour map measured in Example 4 of the present invention.

Moreover, the obtained phase difference plate 10 was disposed at a position adjacently contacting a liquid crystal cell of a liquid crystal display device of an IPS mode to visually evaluate display characteristics. As a result, the display was favorable and uniform when the screen was viewed from the front direction, and even when viewed from the oblique directions within 80 degrees with respect to the polar angle in all azimuth directions. As to this liquid crystal display device, the contrast obtained by optical simulation using a 4×4 matrix is shown in Table 2 and the contrast contour map is shown in FIG. 11.

Example 5

The layered body 11 obtained in Preparative Example 11 was supplied to a tenter crosswise uniaxial stretching machine and stretched in the crosswise direction at a stretching temperature of 155° C. and a stretching ratio of 2.8 (first stretching step). Subsequently, the stretched film was supplied to a lengthwise uniaxial stretching machine and stretched in the lengthwise direction at a stretching temperature of 128° C. and a stretching ratio of 1.2 to obtain a phase difference plate 11 (second stretching step).

In the obtained phase difference plate 11, the slow axis of the resin layer (a), the slow axis of the resin layer (b), and the slow axis of the resin layer (c) were approximately parallel to one another. Furthermore, as to the obtained phase difference plate 11, the in-plane retardation Rea and the NZ coefficient NZa of the resin layer (a), the in-plane retardation Reb and the NZ coefficient NZb of the resin layer (b), and the in-plane retardation Rec and the NZ coefficient NZc of the resin layer (c) were measured. The results are shown in Table 2. The obtained phase difference plate 11 satisfied Formulae 5 to 10.

Figure 12:
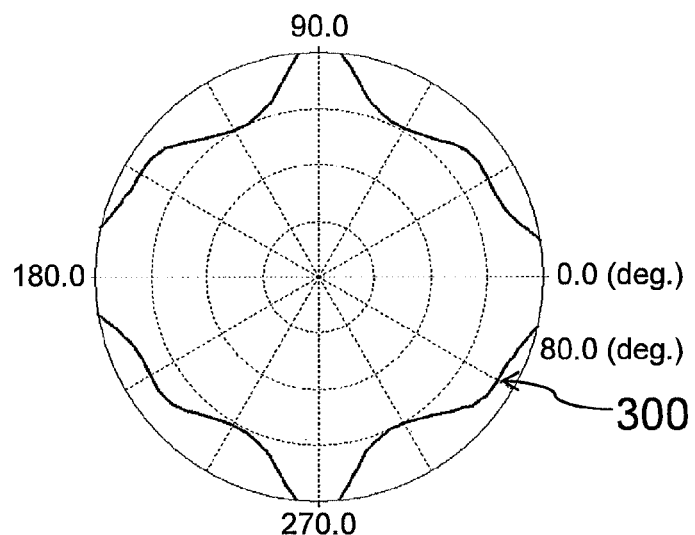
FIG. 12 is a contrast contour map measured in Example of the present invention.

Moreover, the obtained phase difference plate 11 was disposed at a position adjacently contacting a liquid crystal cell of a liquid crystal display device of an IPS mode to visually evaluate display characteristics. As a result, the display was favorable and uniform when the screen was viewed from the front direction, and even when viewed from the oblique directions within 80 degrees with respect to the polar angle in all azimuth directions. As to this liquid crystal display device, the contrast obtained by optical simulation using a 4×4 matrix is shown in Table 2 and the contrast contour map is shown in FIG. 12.

Example 6

The layered body 12 obtained in Preparative Example 12 was supplied to a tenter crosswise uniaxial stretching machine and stretched in the crosswise direction at a stretching temperature of 155° C. and a stretching ratio of 2.8 (first stretching step). Subsequently, the stretched film was supplied to a lengthwise uniaxial stretching machine and stretched in the lengthwise direction at a stretching temperature of 128° C. and a stretching ratio of 1.2 to obtain a phase difference plate 12 (second stretching step).

In the obtained phase difference plate 12, the slow axis of the resin layer (a), the slow axis of the resin layer (b), and the slow axis of the resin layer (c) were approximately parallel to one another. Furthermore, as to the obtained phase difference plate 12, the in-plane retardation Rea and the NZ coefficient NZa of the resin layer (a), the in-plane retardation Reb and the NZ coefficient NZb of the resin layer (b), and the in-plane retardation Rec and the NZ coefficient NZc of the resin layer (c) were measured. The results are shown in Table 2. The obtained phase difference plate 12 satisfied Formulae 5 to 10.

Figure 13:
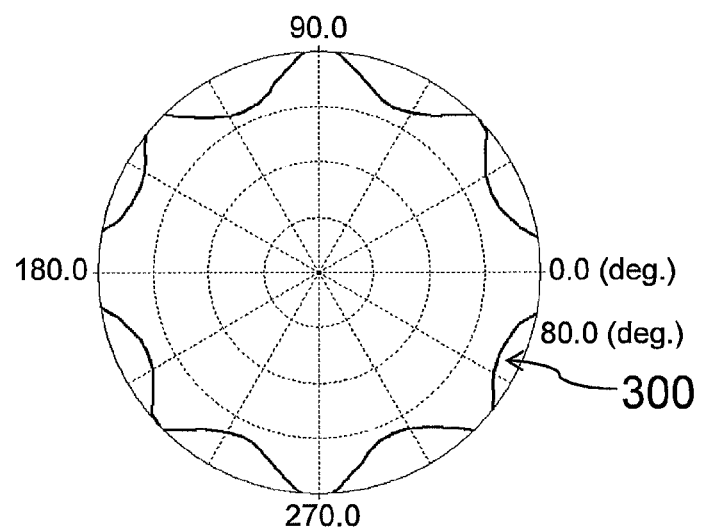
FIG. 13 is a contrast contour map measured in Example 6 of the present invention.

Moreover, the obtained phase difference plate 12 was disposed at a position adjacently contacting a liquid crystal cell of a liquid crystal display device of an IPS mode to visually evaluate display characteristics. As a result, the display was favorable and uniform when the screen was viewed from the front direction, and even when viewed from the oblique directions within 80 degrees with respect to the polar angle in all azimuth directions. As to this liquid crystal display device, the contrast obtained by optical simulation using a 4×4 matrix is shown in Table 2 and the contrast contour map is shown in FIG. 13.

Example 7

The layered body 13 obtained in Preparative Example 13 was supplied to a tenter crosswise uniaxial stretching machine and stretched in the crosswise direction at a stretching temperature of 155° C. and a stretching ratio of 2.8 (first stretching step). Subsequently, the stretched film was supplied to a lengthwise uniaxial stretching machine and stretched in the lengthwise direction at a stretching temperature of 128° C. and a stretching ratio of 1.25 to obtain a phase difference plate 13 (second stretching step).

In the obtained phase difference plate 13, the slow axis of the resin layer (a), the slow axis of the resin layer (b), and the slow axis of the resin layer (c) were approximately parallel to one another. Furthermore, as to the obtained phase difference plate 13, the in-plane retardation Rea and the NZ coefficient NZa of the resin layer (a), the in-plane retardation Reb and the NZ coefficient NZb of the resin layer (b), and the in-plane retardation Rec and the NZ coefficient NZc of the resin layer (c) were measured. The results are shown in Table 2. The obtained phase difference plate 13 satisfied Formulae 5 to 10.

Figure 14:
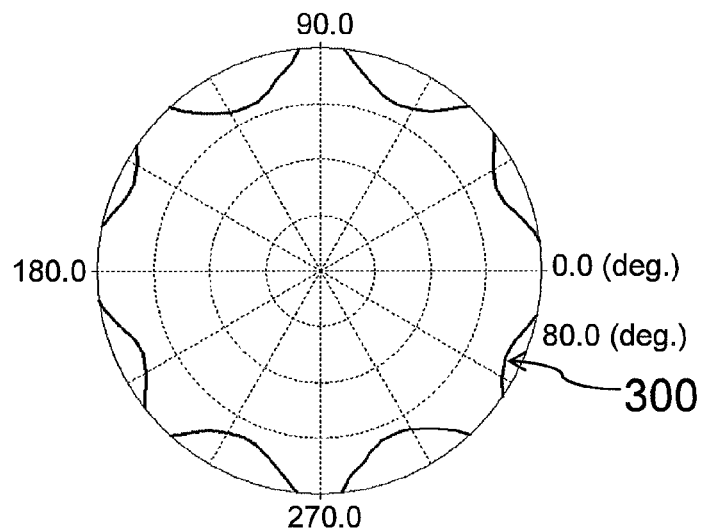
FIG. 14 is a contrast contour map measured in Example 7 of the present invention.
Figure 15:
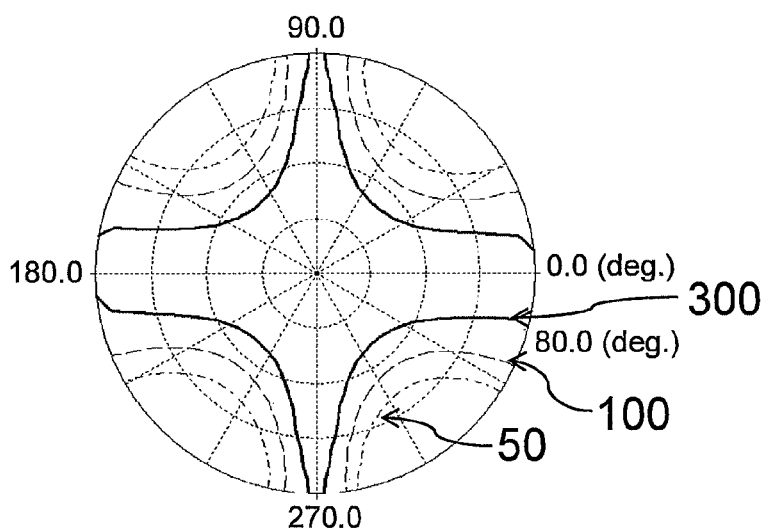
FIG. 15 is a contrast contour map measured in Comparative Example 7.
Figure 16:
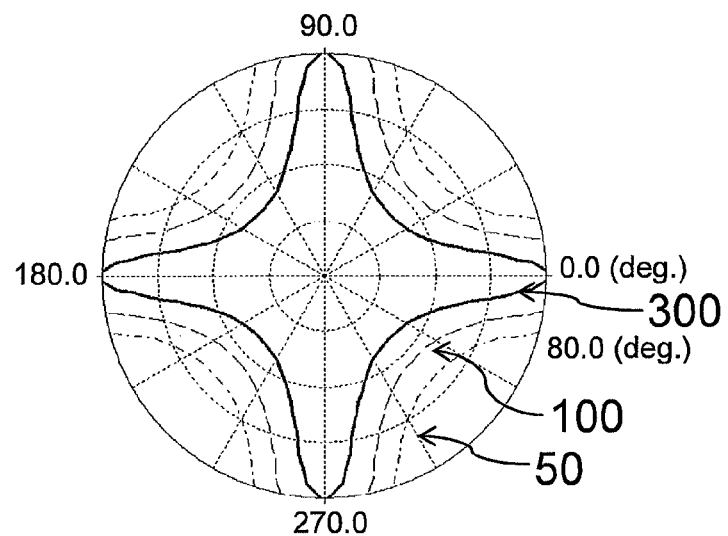
FIG. 16 is a contrast contour map measured in Comparative Example 8.
Figure 17:
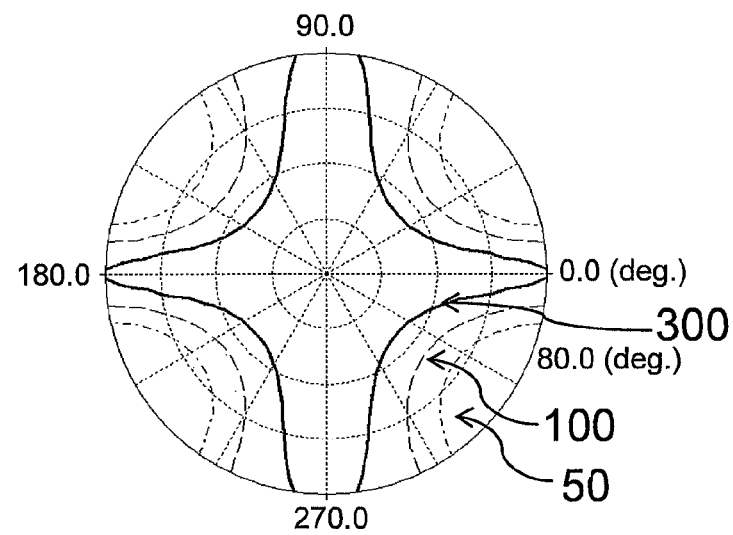
FIG. 17 is a contrast contour map measured in Comparative Example 9.
Figure 18:
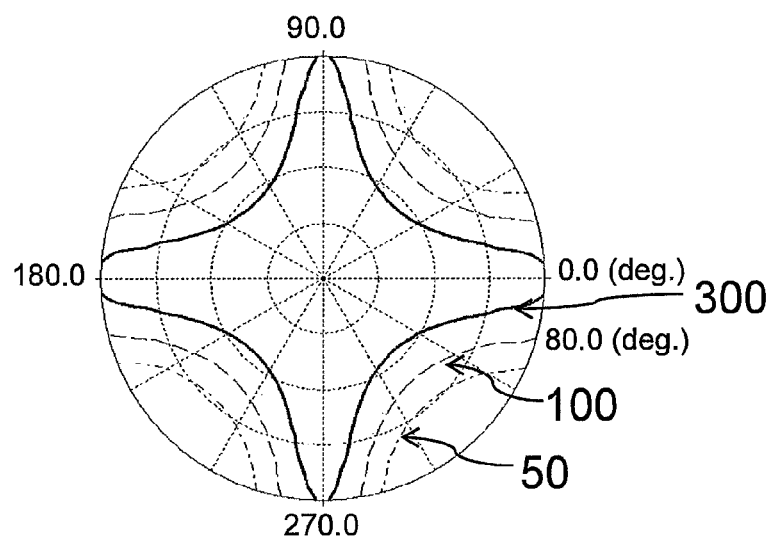
FIG. 18 is a contrast contour map measured in Comparative Example 10.
Figure 19:
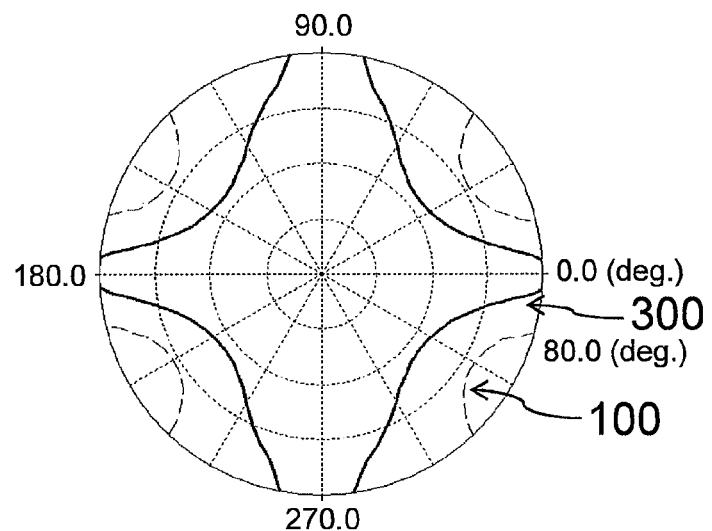
FIG. 19 is a contrast contour map measured in Comparative Example 11.
Figure 20:
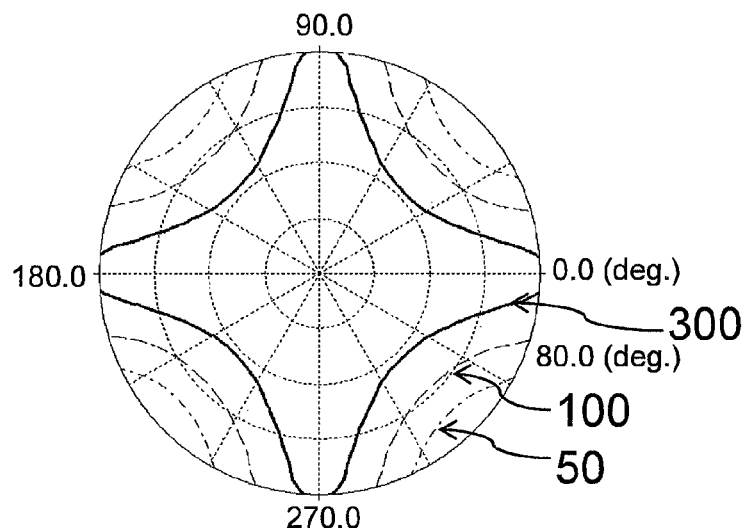
FIG. 20 is a contrast contour map measured in Comparative Example 12.
Figure 21:
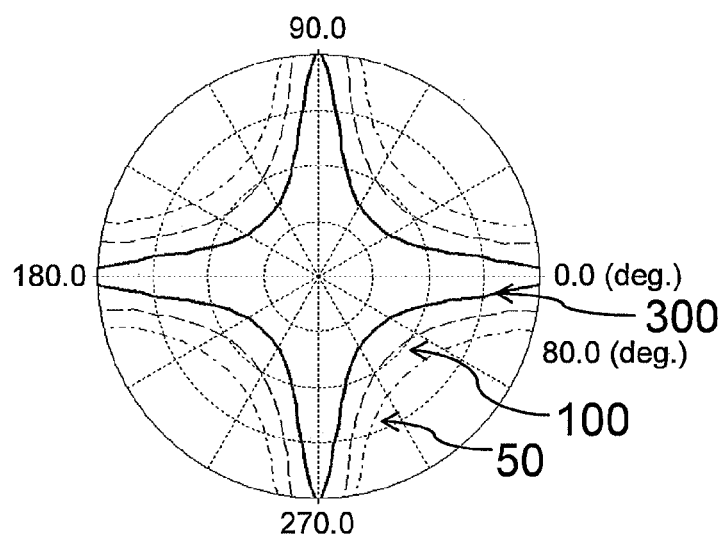
FIG. 21 is a contrast contour map measured in Comparative Example 13.
Figure 22:
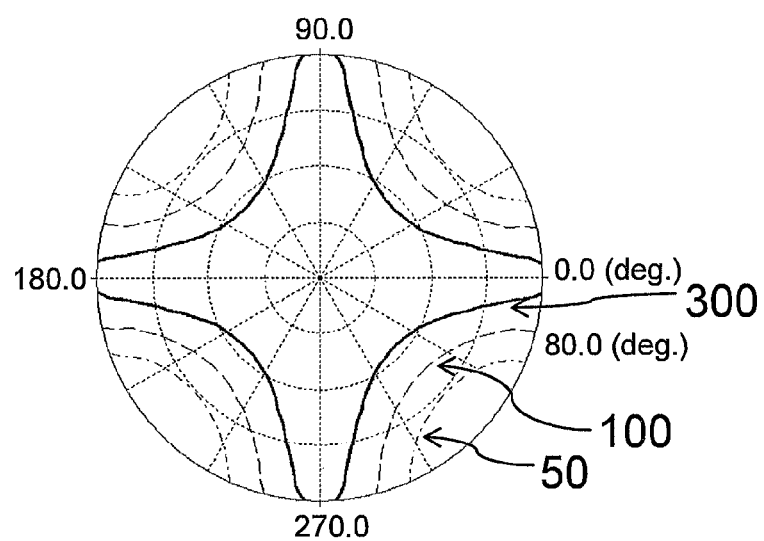
FIG. 22 is a contrast contour map measured in Comparative Example 14.

Moreover, the obtained phase difference plate 13 was disposed at a position adjacently contacting a liquid crystal cell of a liquid crystal display device of an IPS mode to visually evaluate display characteristics. As a result, the display was favorable and uniform when the screen was viewed from the front direction, and even when viewed from the oblique directions within 80 degrees with respect to the polar angle in all azimuth directions. As to this liquid crystal display device, the contrast obtained by optical simulation using a 4×4 matrix is shown in Table 2 and the contrast contour map is shown in FIG. 14.

Comparative Examples 7 to 14

Each of the layered bodies 14 to 21 obtained in Preparative Examples 14 to 21 was supplied to a tenter crosswise uniaxial stretching machine and stretched in the crosswise direction at a stretching temperature of 155° C. and a stretching ratio of 2.8 (first stretching step). Subsequently, each of the stretched films was supplied to a lengthwise uniaxial stretching machine and stretched in the lengthwise direction at a stretching temperature of 128° C. and a stretching ratio of 1.2 to obtain phase difference plates 14 to 21 (second stretching step).

In the obtained phase difference plates 14 to 21, the slow axis of the resin layer (a), the slow axis of the resin layer (b), and the slow axis of the resin layer (c) were approximately parallel to one another. Furthermore, as to the obtained phase difference plates 14 to 21, the in-plane retardation Rea and the NZ coefficient NZa of the resin layer (a), the in-plane retardation Reb and the NZ coefficient NZb of the resin layer (b), and the in-plane retardation Rec and the NZ coefficient NZc of the resin layer (c) were measured. The results are shown in Table 2. The obtained phase difference plates 14 to 21 did not satisfy Formulae 5 to 10.

Moreover, the obtained phase difference plates 14 to 21 were visually evaluated for their display characteristics in the aforementioned manner. As a result, light leaking was observed when the screen was viewed from the oblique directions within 80 degrees with respect to the polar angle. As to these liquid crystal display devices, the contrasts obtained by optical simulation using a 4×4 matrix are shown in Table 2 and the contrast contour maps are shown in FIGS. 15 to 22.

TABLE 1

[Thickness and stretching conditions for each layer of the layered bodies for manufacturing a phase difference plate]

| | Raw-material thickness (μm) | | | 1st stretching (crosswise) | | 2nd stretching (lengthwise) | |
|---|---|---|---|---|---|---|---|
| | Layer A (PC) | Layer B (Pst) | Layer C (PC) | Temperature | Ratio | Temperature | Ratio |
| Ex. 1 | 19.2 | 143.8 | — | 155.0 | 3.50 | 127.0 | 1.20 |
| Ex. 2 | 16.0 | 141.7 | — | 155.0 | 2.80 | 128.0 | 1.20 |
| Ex. 3 | 15.7 | 125.2 | — | 155.0 | 2.80 | 128.0 | 1.25 |
| Ex. 4 | 20.4 | 171.8 | 6.5 | 155.0 | 3.50 | 127.0 | 1.20 |
| Ex. 5 | 17.4 | 184.2 | 8.7 | 155.0 | 2.80 | 128.0 | 1.20 |
| Ex. 6 | 16.7 | 178.1 | 6.5 | 155.0 | 2.80 | 128.0 | 1.20 |
| Ex. 7 | 16.3 | 153.4 | 5.6 | 155.0 | 2.80 | 128.0 | 1.25 |
| Comp. Ex. 1 | 8.7 | 141.7 | — | 155.0 | 2.80 | 128.0 | 1.20 |
| Comp. Ex. 2 | 23.6 | 141.7 | — | 155.0 | 2.80 | 128.0 | 1.20 |

TABLE 1-continued

[Thickness and stretching conditions for each layer of the layered bodies for manufacturing a phase difference plate]

| | Raw-material thickness (μm) | | | 1st stretching (crosswise) | | 2nd stretching (lengthwise) | |
|---|---|---|---|---|---|---|---|
| | Layer A (PC) | Layer B (Pst) | Layer C (PC) | Temperature | Ratio | Temperature | Ratio |
| Comp. Ex. 3 | 16.0 | 109.3 | — | 155.0 | 2.80 | 128.0 | 1.20 |
| Comp. Ex. 4 | 16.0 | 192.3 | — | 155.0 | 2.80 | 128.0 | 1.20 |
| Comp. Ex. 5 | 8.7 | 109.3 | — | 155.0 | 2.80 | 128.0 | 1.20 |
| Comp. Ex. 6 | 23.6 | 192.3 | — | 155.0 | 2.80 | 128.0 | 1.20 |
| Comp. Ex. 7 | 23.6 | 178.1 | 6.5 | 155.0 | 2.80 | 128.0 | 1.20 |
| Comp. Ex. 8 | 8.7 | 178.1 | 6.5 | 155.0 | 2.80 | 128.0 | 1.20 |
| Comp. Ex. 9 | 16.7 | 232.7 | 6.5 | 155.0 | 2.80 | 128.0 | 1.20 |
| Comp. Ex. 10 | 16.7 | 129.5 | 6.5 | 155.0 | 2.80 | 128.0 | 1.20 |
| Comp. Ex. 11 | 16.7 | 178.1 | 1.5 | 155.0 | 2.80 | 128.0 | 1.20 |
| Comp. Ex. 12 | 16.7 | 178.1 | 12.7 | 155.0 | 2.80 | 128.0 | 1.20 |
| Comp. Ex. 13 | 23.6 | 232.7 | 6.5 | 155.0 | 2.80 | 128.0 | 1.20 |
| Comp. Ex. 14 | 8.7 | 129.5 | 1.5 | 155.0 | 2.80 | 128.0 | 1.20 |

TABLE 2

[In-plane retardation, NZ coefficient and contrast]

| | Re | | | NZ | | | Omnidirectional contrast |
|---|---|---|---|---|---|---|---|
| | Layer A (PC) | Layer B (Pst) | Layer C (PC) | Layer A (PC) | Layer B (Pst) | Layer C (PC) | |
| Ex. 1 | 47.0 | 77.0 | — | 2.63 | −0.72 | — | >150 |
| Ex. 2 | 44.0 | 70.0 | — | 3.65 | −1.41 | — | >140 |
| Ex. 3 | 31.7 | 84.3 | — | 4.80 | −1.02 | — | >150 |
| Ex. 4 | 50.0 | 92.0 | 16.0 | 2.63 | −0.72 | 2.63 | >150 |
| Ex. 5 | 48.0 | 91.0 | 24.0 | 3.65 | −1.41 | 3.67 | >160 |
| Ex. 6 | 46.0 | 88.0 | 18.0 | 3.65 | −1.41 | 3.67 | >120 |
| Ex. 7 | 33.0 | 103.2 | 11.4 | 4.80 | −1.02 | 4.80 | >130 |
| Comp. Ex. 1 | 24.0 | 70.0 | — | 3.65 | −1.41 | — | >20 |
| Comp. Ex. 2 | 65.0 | 70.0 | — | 3.65 | −1.41 | — | >1 |
| Comp. Ex. 3 | 44.0 | 54.0 | — | 3.65 | −1.41 | — | >30 |
| Comp. Ex. 4 | 44.0 | 95.0 | — | 3.65 | −1.41 | — | >20 |
| Comp. Ex. 5 | 24.0 | 54.0 | — | 3.65 | −1.41 | — | >20 |
| Comp. Ex. 6 | 65.0 | 95.0 | — | 3.65 | −1.41 | — | >10 |
| Comp. Ex. 7 | 65.0 | 88.0 | 18.0 | 3.65 | −1.41 | 3.67 | >10 |
| Comp. Ex. 8 | 24.0 | 88.0 | 18.0 | 3.65 | −1.41 | 3.67 | >10 |
| Comp. Ex. 9 | 46.0 | 115.0 | 18.0 | 3.65 | −1.41 | 3.67 | >10 |
| Comp. Ex. 10 | 46.0 | 64.0 | 18.0 | 3.65 | −1.41 | 3.67 | >10 |
| Comp. Ex. 11 | 46.0 | 88.0 | 4.0 | 3.65 | −1.41 | 3.67 | >50 |
| Comp. Ex. 12 | 46.0 | 88.0 | 35.0 | 3.65 | −1.41 | 3.67 | >30 |
| Comp. Ex. 13 | 65.0 | 115.0 | 18.0 | 3.65 | −1.41 | 3.67 | >10 |
| Comp. Ex. 14 | 24.0 | 64.0 | 4.0 | 3.65 | −1.41 | 3.67 | >20 |

CONCLUSION

As shown in Table 2, by subjecting the layered body having a certain layer configuration to the first stretching step and the second stretching step, it is possible to manufacture the phase difference plate in which the in-plane retardation Rea and the NZ coefficient NZa of the resin layer (a), and the in-plane retardation Reb and the NZ coefficient NZb of the resin layer (b) satisfy Formulae 1 to 4, or the phase difference plate in which the in-plane retardation Rea and the NZ coefficient NZa of the resin layer (a), the in-plane retardation Reb and the NZ coefficient NZb of the resin layer (b), and the in-plane retardation Rec and the NZ coefficient NZc of the resin layer (c) satisfy Formulae 5 to 10. In Examples 1 to 7 which satisfy Formulae 1 to 4 or Formulae 5 to 10, large omnidirectional contrast was observed, and it is therefrom found out that sufficient optical compensation function is exerted.

The invention claimed is:

1. A method for manufacturing a phase difference plate, comprising:
   a step of forming a layered body including a resin layer (a) containing a resin A having positive intrinsic birefringence, a resin layer (b) containing a resin B having negative intrinsic birefringence, the resin layer (b) being provided on one side of the resin layer (a), and a resin layer (c) containing a resin C having positive intrinsic birefringence, the resin layer (c) being provided on a side of the resin layer (b) that is the opposite to the resin layer (a);
   a first stretching step of stretching the layered body in a first direction at a temperature T1; and
   a second stretching step of, after the first stretching step, stretching the layered body in a second direction that is approximately orthogonal to the first direction at a temperature T2 which is lower than the temperature T1 to obtain a phase difference plate,
   a slow axis of the resin layer (a) after the stretching treatment being approximately parallel to each of a slow axis of the resin layer (b) after the stretching treatment and a slow axis of the resin layer (c) after the stretching treatment in the phase difference plate, and
   wherein a thickness of the resin layer (a), a thickness of the resin layer (b), a thickness of the resin layer (c), and a stretching ratio and a stretching temperature in the first stretching step and the second stretching step being controlled such that in-plane retardation Rea and NZ coefficient NZa in the resin layer (a) after the stretching treatment, in-plane retardation Reb and NZ coefficient NZb in the resin layer (b) after the stretching treatment, and in-plane retardation Rec and NZ coefficient NZc in the resin layer (c) after the stretching treatment satisfy Formulae 5 to 10:

$30 \text{ nm} < Rea < 60 \text{ nm}$  Formula 5

$2.0 < NZa < 5.0$  Formula 6

$70 \text{ nm} < Reb < 110 \text{ nm}$  Formula 7

$-2.0 < NZb < -0.5$  Formula 8

$10 \text{ nm} < Rec < 30 \text{ nm}$  Formula 9

$2.0 < NZc < 5.0$  Formula 10.

2. The method for manufacturing a phase difference plate according to claim 1, wherein a glass transition temperature $Tg_A$ of the resin A and a glass transition temperature $Tg_B$ of the resin B satisfy a relationship of $Tg_A > Tg_B + 5°$ C.

3. The method for manufacturing a phase difference plate according to claim 1, wherein the stretching ratio in the first stretching step is 2 to 4 times, and the stretching ratio in the second stretching step is 1.1 to 2 times.

4. The method for manufacturing a phase difference plate according to claim 1, wherein the layered body is a lengthy film.

5. The method for manufacturing a phase difference plate according to claim 4, wherein the layered body is stretched in a crosswise direction in the first stretching step and stretched in a lengthwise direction in the second stretching step.

6. The method for manufacturing a phase difference plate according to claim 1,
wherein a phase difference generated in each of the resin layer (a), the resin layer (b), and the resin layer (c) depends on the temperature T1 and temperature T2 and the first direction and the second direction, and
wherein the layered body satisfies a relationship of $Nx > Nz > Ny$,
wherein Nx represents a refractive index in an in-plane slow axis direction, Ny represents a refractive index in an in-plane direction orthogonal to the slow axis direction, and Nz represents a refractive index in a thickness direction.

* * * * *